(12) United States Patent
Kitabayashi

(10) Patent No.: US 7,004,590 B2
(45) Date of Patent: Feb. 28, 2006

(54) PRODUCTION METHOD FOR OPTICAL DEVICE, OPTICAL DEVICE PRODUCED BY THIS METHOD AND PROJECTOR PROVIDED WITH THIS OPTICAL DEVICE

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 90 days.

(21) Appl. No.: 10/488,992

(22) PCT Filed: Sep. 10, 2002

(86) PCT No.: PCT/JP02/09197

§ 371 (c)(1),
(2), (4) Date: Apr. 23, 2004

(87) PCT Pub. No.: WO03/023514

PCT Pub. Date: Mar. 20, 2003

(65) Prior Publication Data

US 2004/0263807 A1    Dec. 30, 2004

(30) Foreign Application Priority Data

Sep. 11, 2001  (JP) ............................. 2001-275690
Jul. 3, 2002   (JP) ............................. 2001-194879

(51) Int. Cl.
  *G03B 21/00*  (2006.01)
  *G03B 21/14*  (2006.01)
  *G03B 21/26*  (2006.01)
  *H04N 3/23*   (2006.01)
  *G02B 15/14*  (2006.01)

(52) U.S. Cl. .................... 353/121; 353/30; 353/69; 353/101; 353/122; 348/746; 359/701

(58) Field of Classification Search .............. 353/30, 353/69, 100, 101, 121, 122; 349/5, 7, 8; 348/746; 345/748, 806; 359/701; 352/105
See application file for complete search history.

(56) References Cited

U.S. PATENT DOCUMENTS 6,877,864 B1 * 4/2005 Tamura et al. .............. 353/70

* cited by examiner

*Primary Examiner*—Melissa Jan Koval
(74) *Attorney, Agent, or Firm*—Oliff & Berridge, PLC

(57) ABSTRACT

In manufacturing an optical device having a plurality of optical modulators and a color combining optical system, optical properties of a projection optical system are acquired, reference positions of the optical modulators are acquired, deviations of the optical modulators are calculated based on previously acquired optical properties, and the positions of the optical modulators are adjusted based on the deviations while detecting a combined light from the color combining optical system.

18 Claims, 34 Drawing Sheets

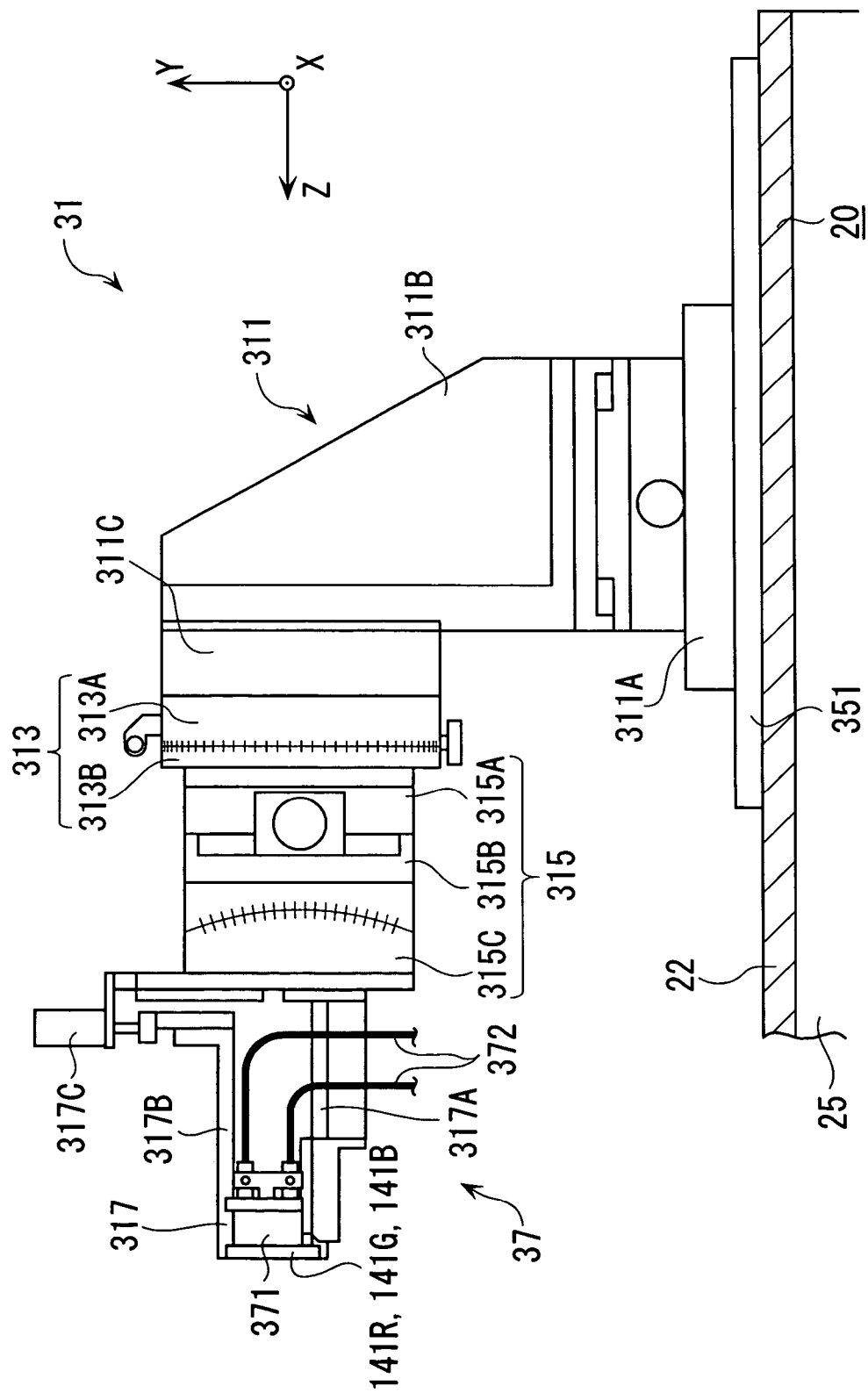

FIG.11
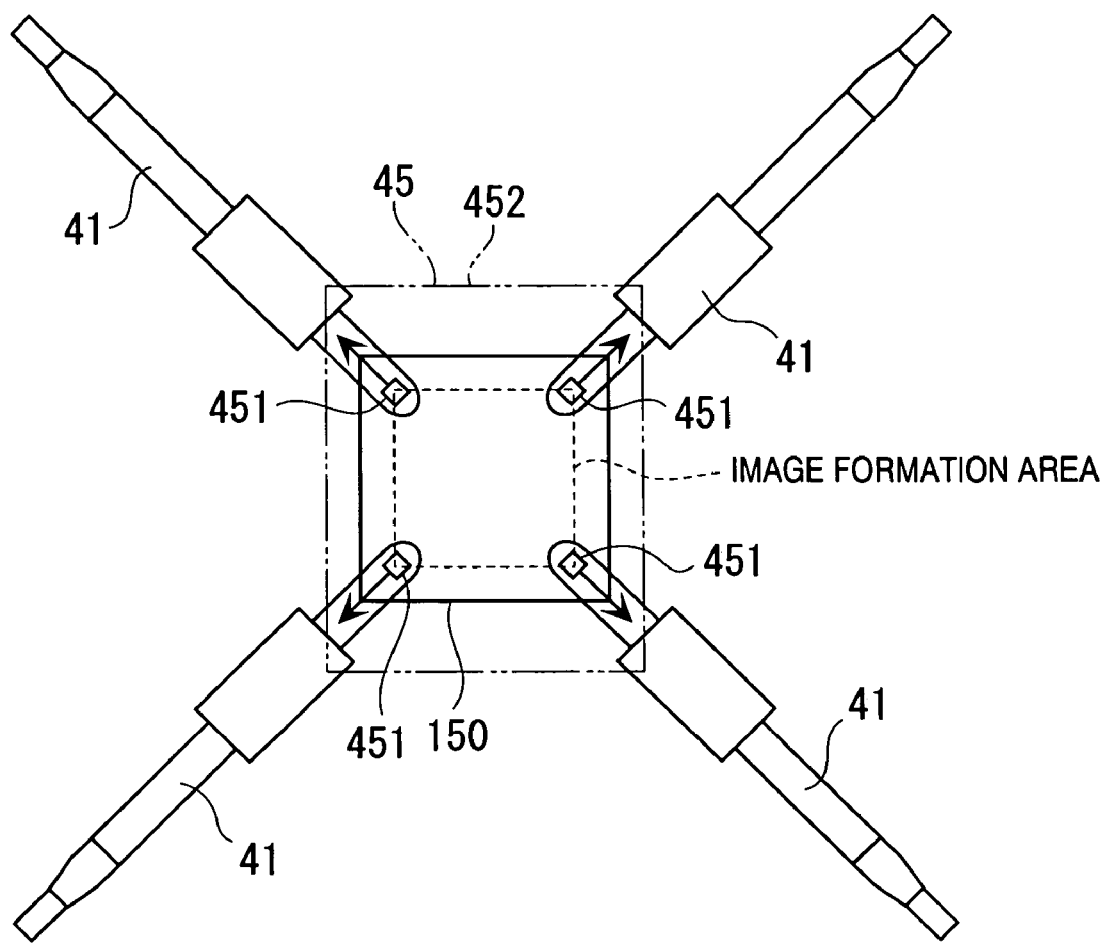
XI-XI
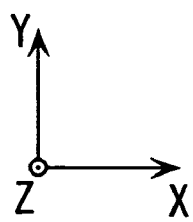

PRODUCTION METHOD FOR OPTICAL DEVICE, OPTICAL DEVICE PRODUCED BY THIS METHOD AND PROJECTOR PROVIDED WITH THIS OPTICAL DEVICE

TECHNICAL FIELD

The present invention relates to an optical device manufacturing method, an optical device manufactured by the method, and a projector having the optical device.

BACKGROUND ART

Conventionally, projectors having a plurality of optical modulators (liquid crystal panels) for respectively modulating a plurality of color lights in accordance with image information, a color combining optical system (cross dichroic prism) for combining respective color lights modulated by the optical modulators, and a projection optical system (projection lens) for enlarging and projecting the light beam combined by the color combining optical system have been used.

Among such projectors, so-called three-plate type projectors have been known, in which a light beam irradiated from a light source is separated into three color lights of red, green and blue by dichroic mirrors, the respective color lights are modulated by three liquid crystal panels in accordance with image information, and the modulated light beams are combined by a cross dichroic prism to form a color image enlarged and projected through a projection lens.

In order to obtain a clear projection image by such projectors, focus adjustment and alignment adjustment of the respective liquid crystal panels must be performed with high accuracy to prevent the pixel-deviation between the respective liquid crystal panels and the deviation in the distance from the projection lens. Here, the focus-adjustment is an adjustment for precisely disposing each respective liquid crystal panel at the back-focus of the projection lens, and the alignment-adjustment is an adjustment for aligning the pixels of the respective liquid crystal panels, which also apply to the description below.

Conventionally, the focus and alignment adjustments of liquid crystal panels are performed on an optical device having three liquid crystal panels and a cross dichroic prism, in accordance with the steps of: (1) irradiating a light beam on an image formation area of the respective liquid crystal panels; (2) detecting the light beam, which is irradiated on the light-incident surface of the cross dichroic prism and then irradiated from the light-irradiation surface with a light-beam detector such as a CCD camera; and (3) adjusting the relative position of each liquid crystal panel while checking the focus and pixel position of each liquid crystal panel detected by the light-beam detector.

Among the detecting methods using a CCD camera, one method to be employed is so-called a master lens method, in which a standard projection lens (master lens) is previously installed on a manufacturing apparatus, the light beam passing through the optical device and the projection lens is projected on the screen, and the projection image is imported; and another method is so-called direct-view method, in which the light beam passing through the optical device is directly imported. By using the above methods, the optical device can be manufactured independently without installing a projection lens thereon, so that the optical device can be manufactured efficiently.

However, in the former method, due to the deviation in the image condition on the back focus position and the axial chromatic aberration, etc. between the master lens and the projection lens combined with the optical device, even if the focus and alignment of the liquid crystal panels are adjusted with high accuracy relative to the master lens, a clear image may not be obtained depending on the projection lens to be combined.

Similarly, in the latter method, after combining a projection lens with the optical device to produce the projector, if the optical property values of the combined projection lens go outside the reference value range, even if the focus and alignment of liquid crystal panels is adjusted with high accuracy, a clear image may not be obtained.

DISCLOSURE OF THE INVENTION

An object of the present invention is to provide a manufacturing method for manufacturing an optical device which can obtain a clear image when a projection optical system is combined, an optical device manufactured by the method, and a projector having the optical device.

An optical device manufacturing method according to an aspect of the present invention is for manufacturing an optical device having: a plurality of optical modulators that respectively modulate a plurality of color lights in accordance with image information; and a color combining optical system including a plurality of light-incident surfaces to which the respective optical modulators are attached and a light-irradiation surface from which the color light incident on the respective light-incident surfaces is irradiated after being combined, the method including: an optical properties acquiring step in which optical properties of a projection optical system to be combined with the optical device are acquired; a reference position acquiring step in which a reference position of the optical modulator relative to the color combining optical system is acquired; a deviation calculating step in which a deviation of the optical modulator relative to the reference position is calculated based on the acquired optical properties of the projection optical system; a combined light detecting step in which a combined light irradiated from the light-irradiation surface is detected using a light-beam detector; and an optical modulator position-adjusting step in which the position of the optical modulator is adjusted based on the deviation while detecting the combined light in the combined light detecting step.

The optical properties may be resolution, inclination of an image, axial chromatic aberration and the like of the projection optical system.

The light-beam detector may be, for instance, a CCD camera having an image pickup element such as a CCD, an image-importing device for importing a signal detected by the image pickup element, and a processor for processing the imported image. A plurality of such CCD cameras may be provided, where, for instance, four CCD cameras may be respectively disposed at the four corners of the projection image to take images at the respective corners. In the above, the respective CCD cameras may preferably be disposed at the diagonals of the projection image so that the CCD cameras does not interfere with each other.

Such optical device of the present invention is manufactured according to the following steps.

(1) In the optical properties acquiring step, the optical property values such as the resolution data and the inclination data of the image of the projection optical system to be combined with the optical device are acquired. For instance, a light beam passing through a predetermined test pattern is introduced into the projection optical system, and the predetermined test pattern is projected on a screen by the light beam. The optical property values such as the axial chromatic aberration, the position of the back focus and the resolution of the projection lens are acquired by taking the image of the test pattern with the CCD camera.

(2) In the reference position acquiring step, the reference positions of the optical modulators relative to the color combining optical system are acquired, and in the deviation calculating step, deviations of the optical modulators relative to the reference positions are calculated based on the acquired optical properties of the projection optical system. The reference positions may be back focus position of the master lens in the aforesaid master lens method, and may be designed reference positions in the aforesaid direct-view method.

(3) In the optical modulator position-adjusting step, the position of the optical modulators are adjusted based on the calculated deviations while detecting the combined light irradiated from the light-irradiation surface of the color combining optical system by the light-beam detector in the combined light detecting step. After the positions are adjusted, the liquid crystal panels are fixed to obtain the optical device.

Since the adjustment is conducted according to the above steps, an optical device in which the position of the optical modulator relative to the color combining optical system is adjusted with high accuracy in accordance with the optical properties of the projection lens to be combined can be obtained. Accordingly, when the optical device and the projection optical system are combined, a clear projection image can be obtained.

In the above aspect of the present invention, after the position of the optical modulator is adjusted while detecting the combined light, the optical modulator may be moved in a direction of the optical axis of the projection optical system by a distance corresponding to the deviation in the optical modulator position-adjusting step.

According to the above arrangement, since the optical modulators are adjusted while the light-beam detector is kept at the reference position, which is moved by the distance equivalent to the deviation, the adjustment can be quickly conducted.

In the optical modulator position-adjusting step, the position of the optical modulator may be adjusted after adjusting the position of the light-beam detector based on the deviation.

According to the above arrangement, since the positions of the optical modulators can be adjusted after the light-beam detector is set based on the deviation of the projection optical system, the positions of the optical modulators can be adjusted with high accuracy.

The optical properties acquiring step may preferably be conducted by reading the optical properties recorded on a distribution label attached corresponding to the projection optical system to be combined.

According to the above arrangement, since the optical property values of the projection optical system are acquired with the distribution label indicating the optical property values being attached, the projection optical system and the optical property values of the projection optical system can be handled in an integrated manner, so that the inputting error in the optical properties acquiring step can be prevented and the efficiency of production process can be improved.

An optical device manufacturing method according to another aspect of the present invention is for manufacturing an optical device having a plurality of optical modulators that respectively modulate a plurality of color lights in accordance with image information, a color combining optical system including a plurality of light-incident surfaces to which the respective optical modulators are attached and a light-irradiation surface from which the color lights incident on the respective light-incident surfaces and irradiated after being combined, the method including: a combined light detecting step in which a combined light irradiated from the light-irradiation surface of the color combining optical system is detected using a light-beam detector; an optical modulator attitude-adjusting step in which the attitude of the optical modulator relative to the color combining optical system is adjusted while detecting the combined light, the optical modulators being held by a holder of a position-adjusting device that adjust the position of the respective optical modulators; an optical modulator fixing step in which the optical modulator of which attitude has been adjusted is fixed to the light-incident surface of the color combining optical system; a reference position acquiring step in which a reference position of the holder of the position-adjusting device relative to the light-beam detector is acquired before conducting the optical modulator attitude-adjusting step; a deviation acquiring step in which, after conducting the optical modulator attitude-adjusting step, the acquired reference position of the holder is compared with an adjustment position at which the holder is located after the attitude of the optical modulator is adjusted to acquire a deviation of the adjustment position relative to the reference position of the holder; and a deviation data storing step in which the acquired deviation is stored as a measurement data.

In the present invention, a position-adjusting device with the following arrangement, for instance, can be used.

Specifically, the position-adjusting device may include a platform with the color combining optical system mounted on a predetermined position, a position-adjusting device body for adjusting the position of the respective optical modulators relative to the light-irradiation surface of the color combining optical system mounted on the platform by driving the holders that hold the optical modulators, a light-transmissive screen on which the light irradiated by a light source to be incident on the optical modulator of which position has been adjusted is projected in an enlarged manner through a standard projection optical system (master lens) disposed on a downstream of the optical path of the light-irradiation surface of the color combining optical system to form a projected image, a light-beam detector provided on the backside of the light-transmissive screen for detecting the projection image projected on the light-transmissive screen, and a computer for adjusting the positions of the optical modulators relative to the position-adjusting device body based on the detected image.

According to the above aspect of the present invention, since the deviations of the adjustment position relative to the reference position can be acquired and accumulated as measuring data, by acquiring the optical properties of individual projection optical system in advance, a projection optical system suitable for the manufactured optical device can be easily selected based on the relationship between the acquired deviations of the optical modulators and the optical properties of the projection optical system. By using such combination, the optical device capable of the projecting clear image can be manufactured with high efficiency and high accuracy.

The reference position acquiring step may preferably include: a laser-beamer position identifying step in which a laser beam is irradiated from a laser-beamer approximately perpendicularly onto a surface of a first reflection member provided on a predetermined position on a platform on which the color combining optical system is mounted and the light reflected by the first reflection member is detected, so that the position of the laser-beamer is identified by aligning the irradiated light with the reflected light; a second reflection member holding step in which a second reflection member is held by the holder of the position-adjusting device; a second reflection member attitude-adjusting step in which the laser beam is irradiated from the laser-beamer of which position has been identified to the second reflection member held by the holder, and the attitude of the second reflection member held on the holders are adjusted while detecting the reflected light by the light-beam detector by aligning the irradiated light with the reflected light; and a reference position acquiring step in which the position of the holder when the attitude of the second reflection member is adjusted is acquired as the reference position.

When the direction of the laser beam irradiated by the laser-beamer is approximately perpendicular to the surface of the second reflection member disposed instead of the optical modulator (i.e. the laser-beamer is opposed to the second reflection member on a straight line), nothing needs to be disposed between the laser-beamer and the second reflection member. However, when the direction of the laser beam irradiated by the laser-beamer is parallel to the surface of the second reflection member, a right angle prism needs to be disposed at the reference position of the platform to bend the laser beam by ninety degrees so that the laser beam is incident on the second reflection member approximately perpendicularly.

According to the above arrangement, the reference positions of the holder of the position-adjusting device can be easily recognized by aligning the irradiated light from the laser-beamer with the reflected light from the surface of the second reflection member. Accordingly, the deviations of the adjustment position relative to the reference position can be easily acquired as a numeric data as a measuring data.

In the deviation acquiring step, the measuring data of the deviations may preferably be acquired by a unit of length and angle, and the unit can be, for instance, $\mu m$ (length) and degree (angle). Accordingly, since the measuring data of the deviations are numeric data easily understood by an operator, workability can be improved.

An optical device according to still another aspect of the present invention is manufactured with the above optical device manufacturing method, and a projector according to further aspect of the present invention has the above optical device.

According to the above aspects of the present invention, the same advantages as aforesaid optical device manufacturing method can be attained. In other words, since the optical device corresponding to the optical property values of the projection lens can be manufactured, a projector capable of projecting a clear image can be manufactured.

BRIEF DESCRIPTION OF THE DRAWINGS

FIG. 8 is a side view showing a position-adjusting mechanism of the position-adjusting device;

FIG. 11 is a front view showing the light-beam detector of the position-adjusting device, seen from arrows XI-XI of FIG. 10;

BEST MODE FOR CARRYING OUT THE INVENTION

Embodiments of the present invention will be described below with reference to the drawings.

[1] First Embodiment

[1-1] Arrangement of Projector

Figure 1:
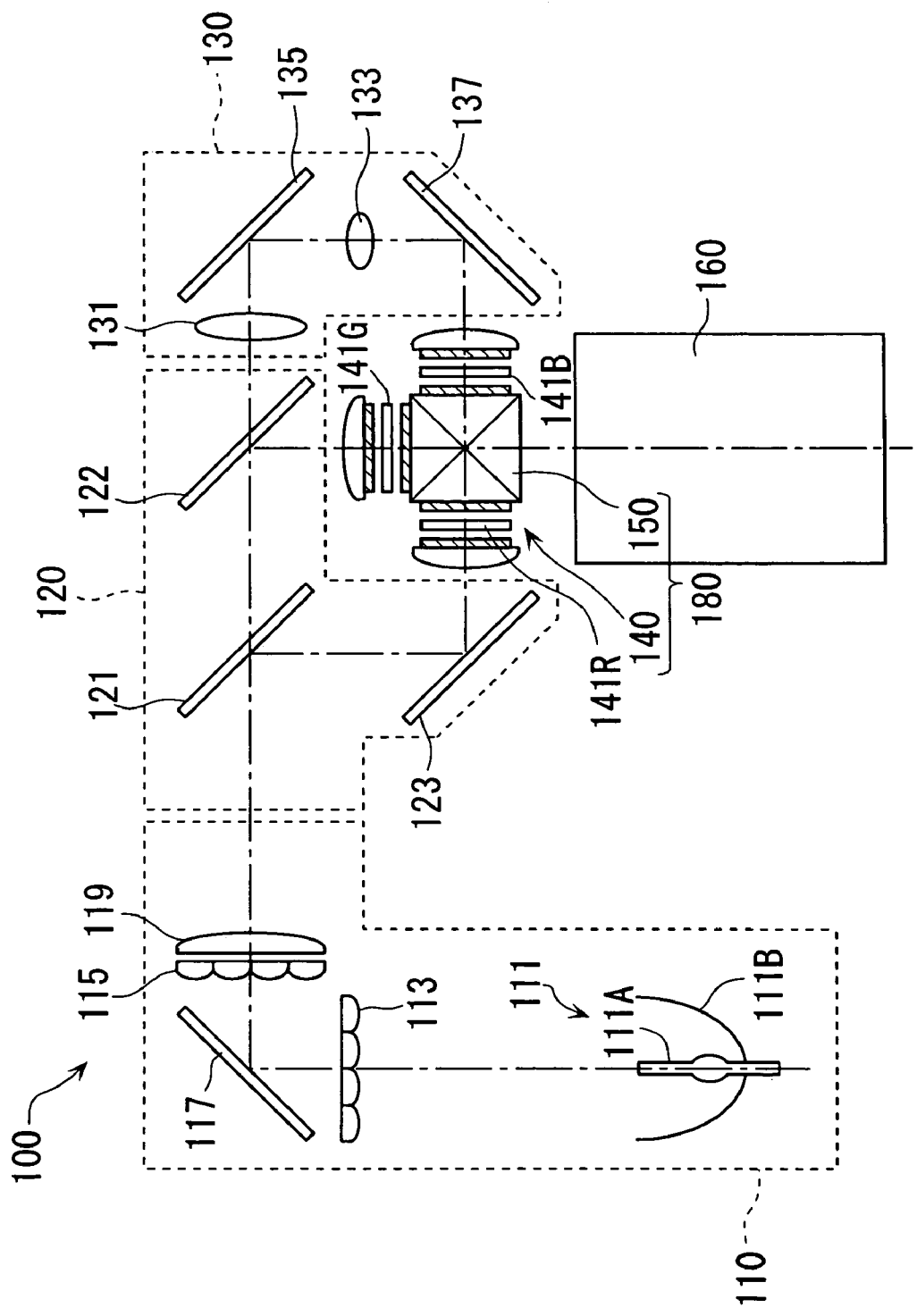
FIG. 1 is a schematic illustration showing a structure of a projector having an optical device according to the embodiments of the present invention.

FIG. 1 is a schematic illustration showing a structure of a projector having an optical device to be adjusted that has a plurality of optical modulators and a color combining optical system.

The projector 100 has an integrator illuminating optical system 110, a color-separating optical system 120, a relay optical system 130, an electro-optic device 140, a cross dichroic prism 150 (color combining optical system), and a projection lens 160.

The integrator illuminating optical system 10 has a light source 111 including a light source lamp 111A and a reflector 111B, a first lens array 113, a second lens array 115, a reflection mirror 117, and a superposing lens 119. The light beam irradiated by the light source lamp 111A is separated into a plurality of sub-beams by the first lens array 113 after the irradiation direction thereof is aligned by the reflector 111B, and the sub-beam is focused near the second lens array 115 after the irradiation direction of sub-beam is bent by ninety degrees by the reflection mirror 117. The respective sub-beams irradiated by the second lens array 115 are incident on the superposing lens 119 so that the central axis (main beam) is perpendicular to the incident-side of the superposing lens 119, and the plurality of sub-beams irradiated by the superposing lens 119 are superposed on three liquid crystal panels 141R, 141G and 141B of the electro-optic device 140.

The color-separating optical system 120 has two dichroic mirrors 121 and 122 and a reflection mirror 123, the dichroic mirrors 121, 122 and reflection mirror 123 separating the plurality of sub-beams irradiated by the integrator illuminating optical system 110 into three color lights of red, green and blue.

The relay optical system 130 has an incident-side lens 131, a relay lens 133 and reflection mirrors 135 and 137, which slides the blue light B, for instance, separated by the color separating optical system 120, into the liquid crystal panel 141B.

The electro-optic device 140 has three liquid crystal panels 141R, 141G and 141B, which use, for instance, a polysilicon TFT as a switching element, and the color lights separated by the color separating optical system 120 are modulated by the three liquid crystal panels 141R, 141G and 141B in accordance with image information to form an optical image.

The cross dichroic prism 150 combines the images modulated for respective color lights irradiated by the three liquid crystal panels 141R, 141G and 141B to form a color image. Incidentally, a dielectric multilayer film for reflecting the red color light and another dielectric multilayer film for reflecting the blue light are formed on the cross dichroic prism 150 in an approximate X-shape along the boundaries of four right-angle prisms, and the three color lights are combined by the dielectric multilayer films. The color image combined by the cross dichroic prism 150 is irradiated by the projection lens 160 to be enlarged and projected on a screen.

[1-2] Detailed Construction of Optical Device

Figure 2:
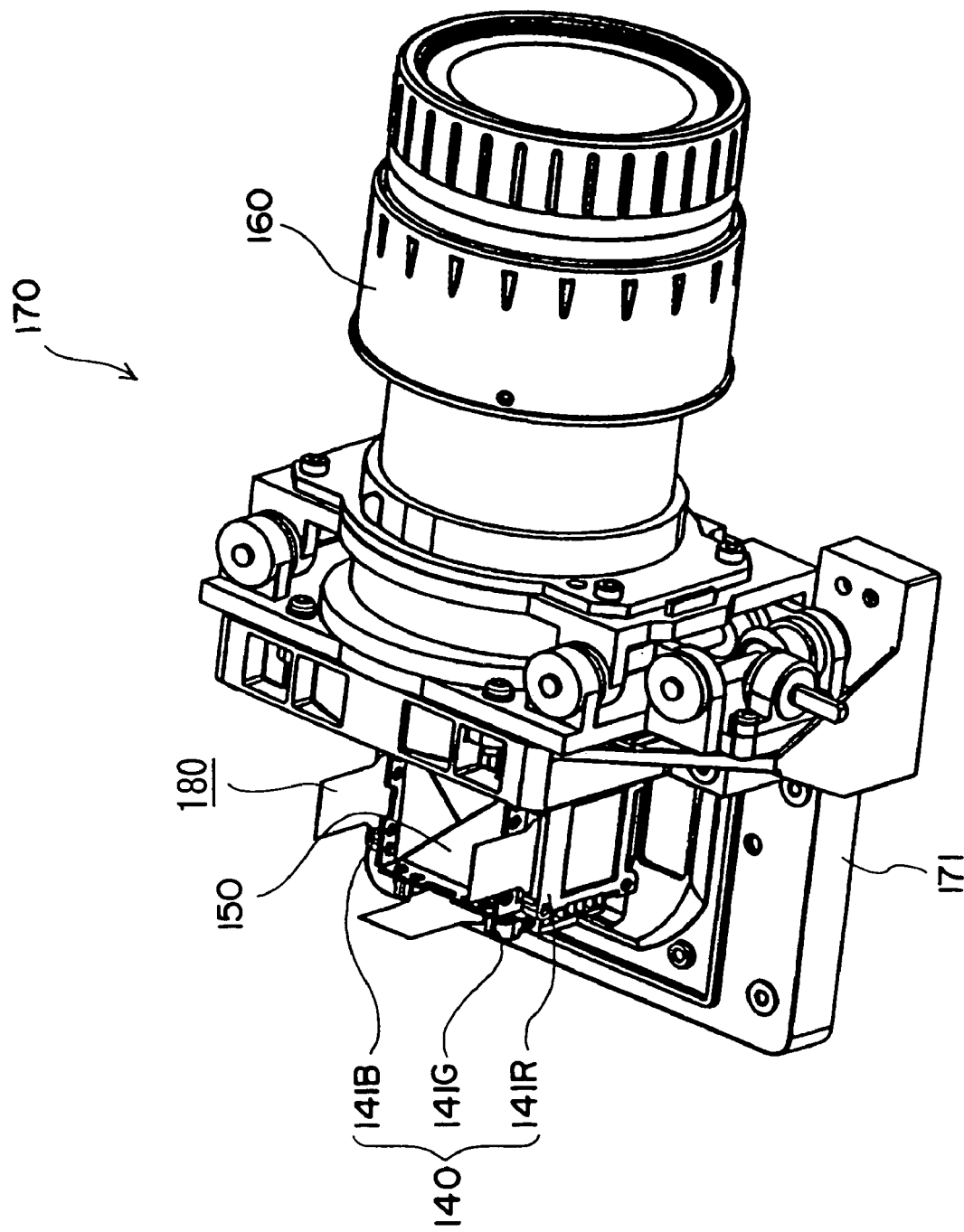
FIG. 2 is an exterior perspective view showing the structure of a primary portion of the projector.

In the projector 100, an optical device 180 having the electro-optic device 140 and the cross dichroic prism 150, and the projection lens 160 paired with the optical device 180 are integrally formed as an optical unit 170. Specifically, as shown in FIG. 2, the optical unit 170 has an L-shaped-sided head 171 made of magnesium alloy etc.

Figure 3:
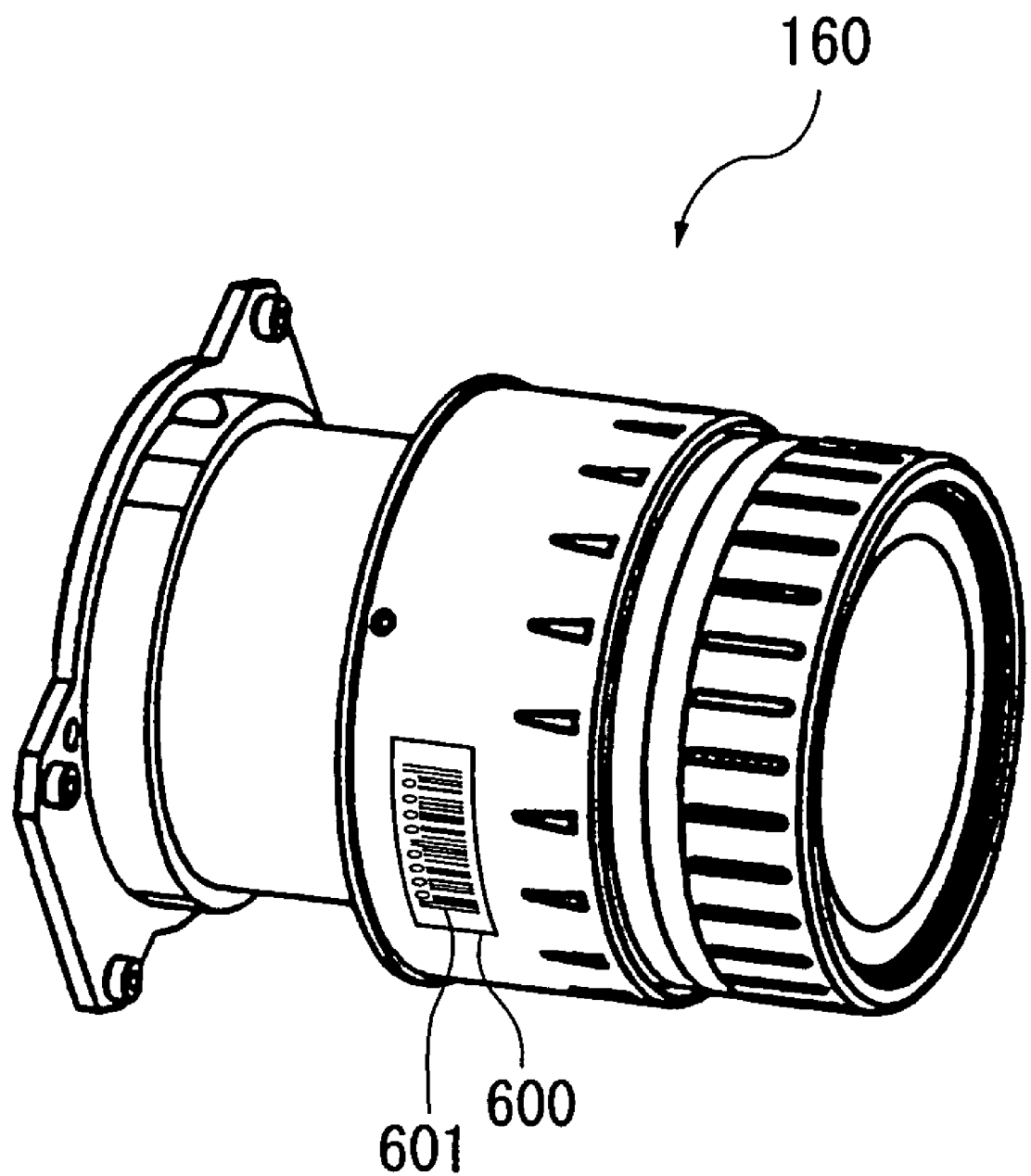
FIG. 3 is a perspective view showing a projection lens of the embodiments.

The projection lens 160 is fixed to an outer side of a vertical surface of the head 171 by screws. Further, as shown in FIG. 3, a distribution label 600 indicating a bar-code 601 that records the below-described optical property values of the projection lens 160 is stuck to the projection lens 160. The cross dichroic prism 150 is screwed on an upper side of the horizontal surface of the L-shaped head 171.

Figure 4:
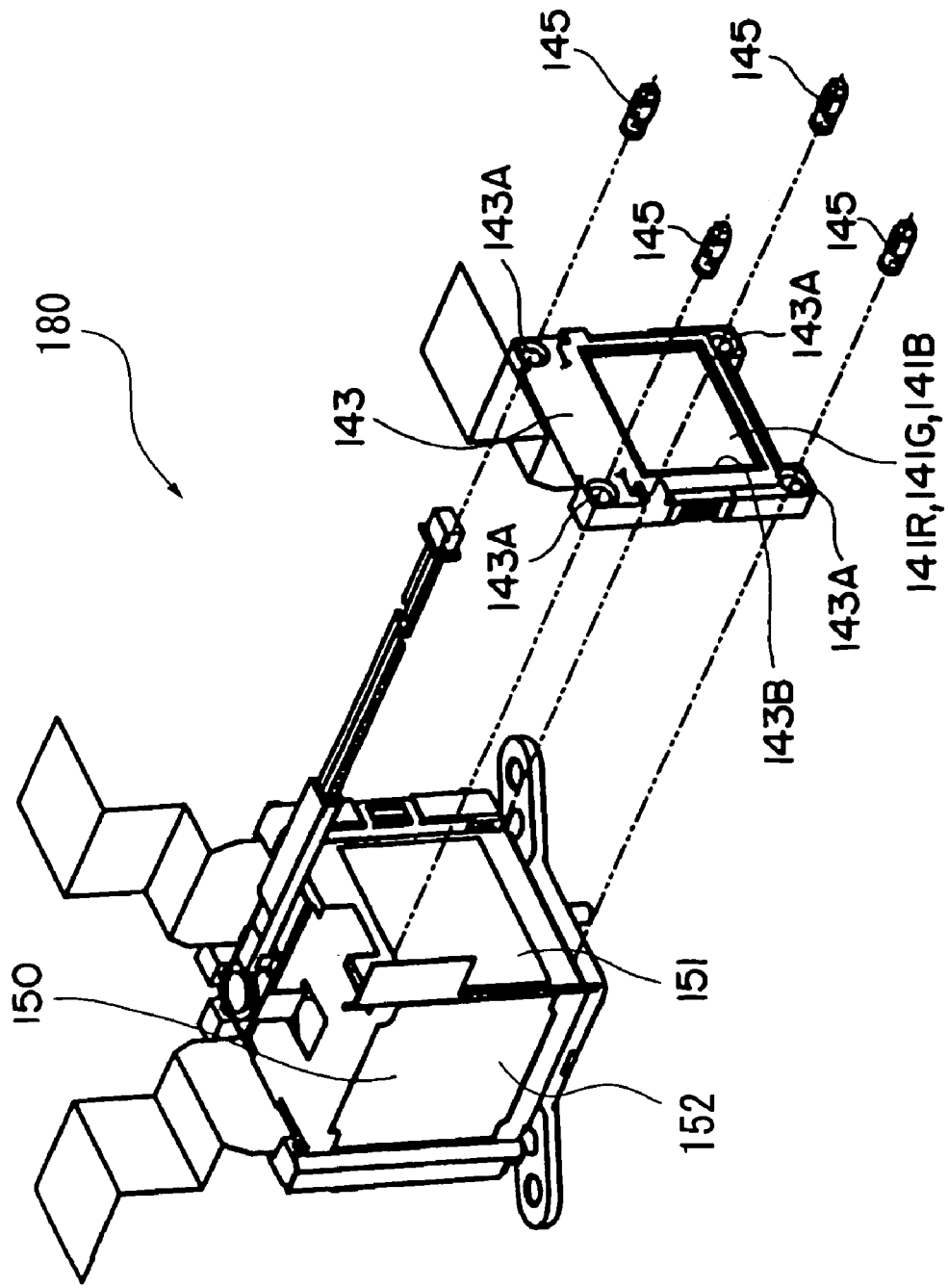
FIG. 4 is an exploded perspective view showing the optical device of the embodiments.

The three liquid crystal panels 141R, 141G, and 141B of the electro-optic device 140 are disposed such that three side faces of the cross dichroic prism 150 are surrounded by the respective liquid crystal panels. Specifically, as shown in FIG. 4, the respective liquid crystal panels 141R, 141G, and 141B are fixed to the cross dichroic prism 150 by a so-called POP (Panel On Prism) structure, where the liquid crystal panels 141R, 141G and 141B are accommodated in the holding frames 143, which are fixed on the light-incident surfaces 151 of the cross dichroic prism 150 with pins 145 made of transparent resin together with ultraviolet curing adhesive being inserted into the holes 143A formed on the four corners of the holding frames 143. Rectangular openings 143B are formed on the holding frames 143 to expose the respective liquid crystal panels 141R, 141G, and 141B to form image formation areas. The color lights of red, green and blue are introduced into the areas of the respective liquid crystal panels 141R, 141G, and 141B to form an optical image in accordance with image information.

In the optical device 180 with the POP structure, when the liquid crystal panels 141R, 141G and 141B are fixed to the cross dichroic prism 150, since the focus and alignment adjustment and the fixing of the liquid crystal panels 141R, 141G and 141B must be performed approximately at the same time, the assembling process is usually performed according to the following steps:

(1) The first liquid crystal panel, the liquid crystal panel 141G for instance, is fixed to the cross dichroic prism 150. Specifically, the pins 145 with the ultraviolet curing adhesive applied to the tip thereof are inserted into the holes 143A of the holding frame 143 of the liquid crystal panel 141G;

(2) The tip ends of the pins 145 are brought into contact with the light-incident surface 151 of the cross dichroic prism 150;

(3) In this state, the light beam is introduced on the image formation area of the liquid crystal panel 141G, and, while directly monitoring the light beam irradiated from the cross dichroic prism 150, the advancement and retraction position, the plan position and the rotary position of the liquid crystal panel 141G relative to the light-incident surface 151 are adjusted to adjust the focus and alignment of the liquid crystal panel 141G.

(4) After the focus and alignment are properly adjusted, fixing light beam (ultraviolet) is irradiated from base end of the pins 145 to cure the ultraviolet curing adhesive completely.

(5) The other liquid crystal panels 141R and 141B are bonded and fixed in the same manner as the above.

Accordingly, when the optical device 180 with the POP structure is assembled, a position-adjusting device for adjusting mutual focus and alignment of the respective liquid crystal panels 141R, 141G and 141B is necessary. Incidentally, the position-adjusting device will be described below.

[1-3] Arrangement of Projection Lens Inspection Device

Figure 5:
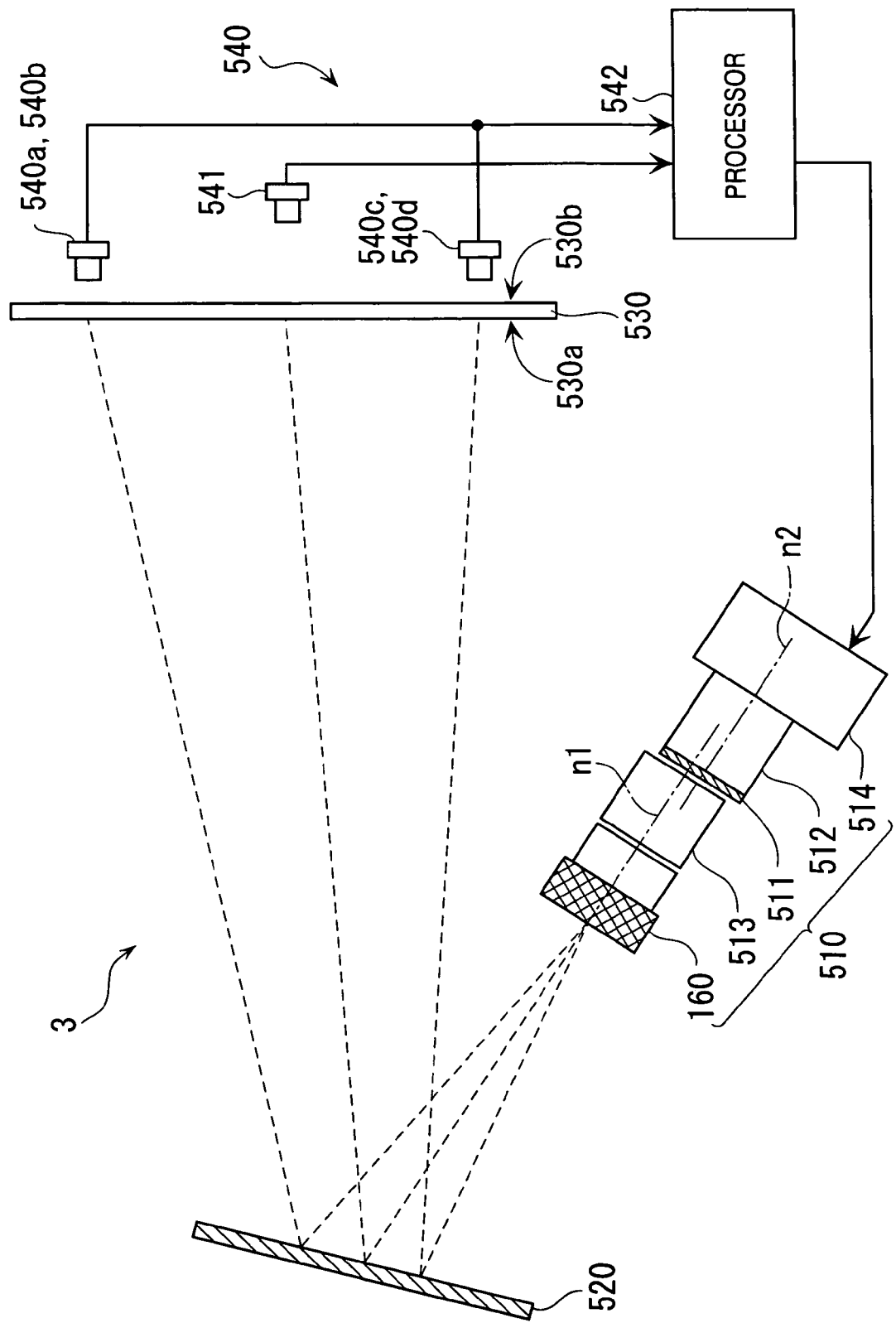
FIG. 5 is a schematic illustration of an inspection device of the projection lens.

FIG. 5 is a schematic illustration of a projection lens inspection device 3.

The projection lens inspection device 3 is for measuring the optical property values of the projection lens 160 to be combined with the optical device 180, which includes a projecting portion 510 to which a projection lens 160 is mounted, a mirror 520, a screen 530, and a checking portion 540. In the device 3, the projection lens 160 to be measured is detachable so that the projection lens can be easily exchanged with the other projection lens to be measured.

The projecting portion 510 is a simulating device for irradiating an approximately the same light beam as the light beam irradiated when the projection lens 160 of the projector 100 is actually used into the projection lens 160, which includes a light source (not shown), a check sheet 511 containing a predetermined test pattern for simulating the liquid crystal panels 141R, 141G and 141B, a holder 512 for holding the check sheet 511, a dummy prism 513 for simulating the cross dichroic prism 150, and a six-axis adjuster 514 for adjusting the spatial position of the projection lens 160 by adjusting the spatial position of the holder 512. The predetermined test pattern includes various kinds of patterns respectively for contrast-adjusting, resolution-adjusting, color aberration measuring and the like. Accordingly, in the projecting portion 510, the light beam irradiated from the light source enters into the projection lens 160 after passing through the test-pattern-containing check sheet 511 and the dummy prism 513.

Incidentally, in order to simulate a so-called "up-shift projection", a central axis n1 of the dummy prism 513 and the projection lens 160 and a central axis n2 of the holder 512 holding the check sheet 511 and the six-axis adjuster 514 are shifted in parallel by a predetermined distance.

The screen 530 is a light-transmissive screen capable of viewing the image light from the backside 530b opposite to a projection surface 530a on which the image light is projected.

The checking portion 540 is for measuring optical properties of the image projected on the screen 530, which includes four adjusting image pickup portions 540a to 540d, a measuring image pickup portion 541, and a processor 542. The processor 542 is electrically connected to the adjusting image pickup portions 540a to 540d and the measuring image pickup portion 541, as well as the six-axis adjuster 514.

The four adjusting image pickup portions 540a to 540d are provided at positions corresponding to four corners of the image projected on the screen 530 to adjust the image-forming position and trapezoidal distortion of the projection image. The measuring image pickup portion 541 is for capturing the test-pattern-containing image.

In the projection lens inspection device 3, the test-pattern-containing image light irradiated by the projecting portion 510 is projected on the screen 530 after being reflected by the mirror 520. While capturing the projected test pattern image by the four adjusting image pickup portions 540a to 540d, the processor 542 adjusts the spatial position of the projecting portion 510 to adjust the projection image. Thereafter, the measuring image pickup portion 541 captures the test pattern image, and, in accordance with the captured signal, the processor 542 acquires the optical property values of the projection lens 160 such as the resolution, inclination of the image and the like (optical properties acquiring step).

The optical properties acquired by projection lens inspection device 3 are, as shown in FIG. 3, recorded as the bar-code 601, which is indicated on the distribution label 600. On the backside of the distribution label 600 opposite to the side on which the bar-code 601 is indicated, an adhesive (not shown) is coated so that the distribution label 600 is pasted on the corresponding projection lens 160. Incidentally, the distribution label 600 is pasted to the projection lens 160 in a detachable manner.

[1-4] Arrangement of Position-adjusting Device of Optical Modulator

A position-adjusting device for adjusting the position of the respective liquid crystal panels will be described below.

Figure 6:
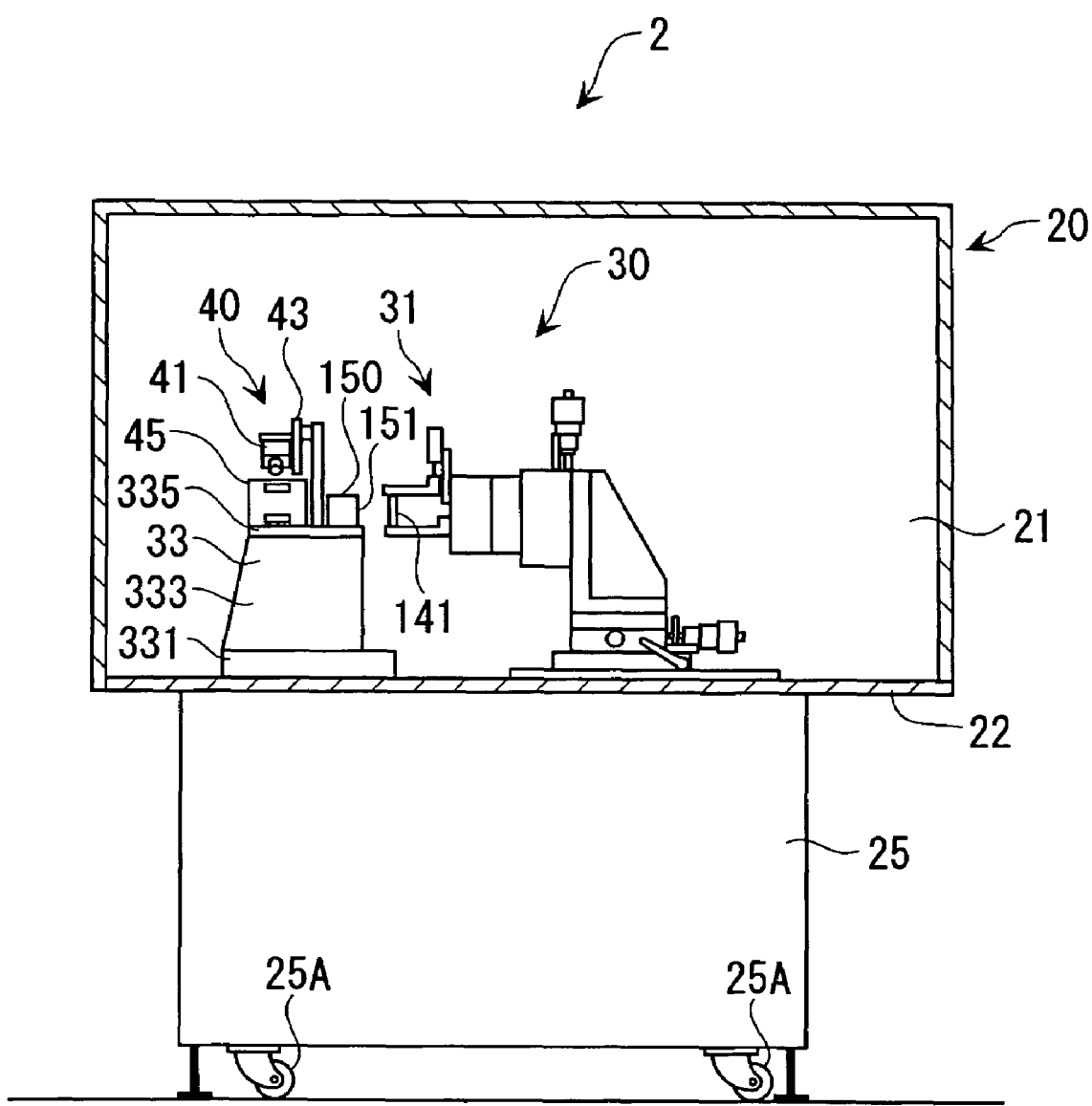
FIG. 6 is a side view showing a position-adjusting device for adjusting the position of the optical modulator.
Figure 7:
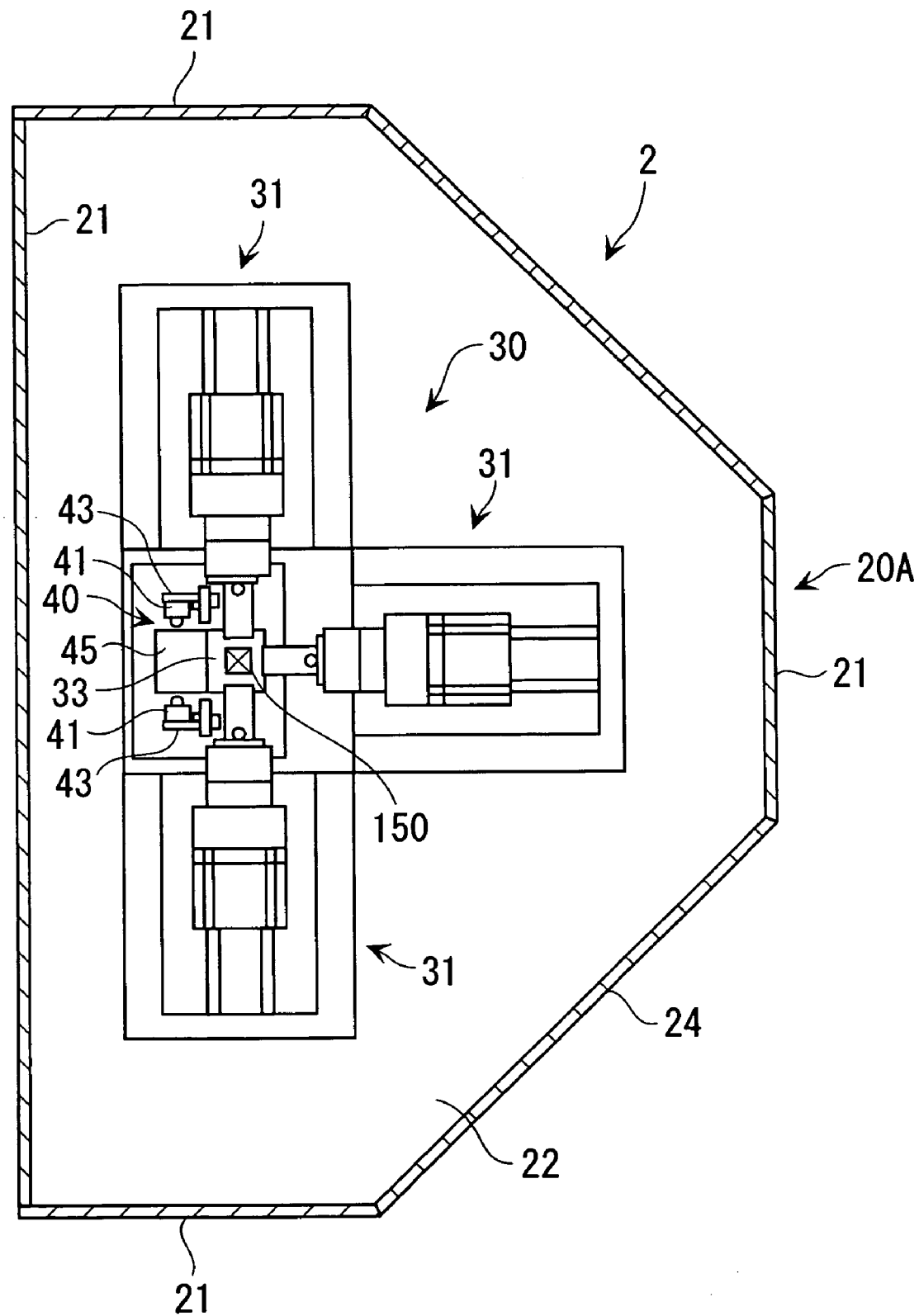
FIG. 7 is a plan view of the position-adjusting device.

FIGS. 6 and 7 show a position-adjusting device 2 for adjusting the position of the respective liquid crystal panels 141R, 141G and 141B.

The position-adjusting device 2 includes a UV-shielding cover 20, an adjuster body 30, a light-beam detector 40, an adjusting light source device (not shown), a fixing ultraviolet light source device (not shown), and a computer (not shown in FIG. 6) for controlling to the operation of the respective devices and for processing images.

The UV-shielding cover 20 has a side plate 21 and a bottom plate 22 that surround the adjuster body 30, and a platform 25 provided therebelow. Incidentally, the side plate 21 is provided with an open/close door (not shown). The door is for supplying and removing the optical device 180 (FIG. 4) and for adjusting the adjuster body 30, which is made of acrylic resin that transmits no ultraviolet light or the like. The platform 25 is provided with casters 25A at the bottom thereof for easily moving the adjuster body 30.

The adjusting light source is the source of the position-adjusting light beam used during adjusting operation by the adjuster body 30. The fixing ultraviolet light source device is the source of the adjusting light beam (ultraviolet) for curing the ultraviolet curing adhesive in fixing the liquid crystal panels 141R, 141G and 141B to the cross dichroic prism 150.

[1-4-1] Arrangement of Adjuster Body

As shown in FIG. 6, the adjuster body 30 includes a six-axis position adjusting unit 31, a supporting jig 33 for supporting the cross dichroic prism 150, and a light source unit 37 (FIG. 8) for introducing the light beams from the adjusting light source device and the fixing ultraviolet light source device into the liquid crystal panels 141R, 141G and 141B.

The six-axis position adjusting unit 31 is for adjusting the position of the liquid crystal panels 141R, 141G and 141B relative to the light-incident surfaces 151 of the cross dichroic prism 150. As shown in FIG. 8, the six-axis position adjusting unit 31 includes a plan position adjuster 311 movable along the rail 351 of the bottom plate 22 of the UV-shielding cover 20, an in-plane rotary position adjuster 313 provided at the distal end of the plan position adjuster 311, an out-plane rotary position adjuster 315 provided at the distal end of the in-plane rotary position adjuster 313, and a liquid crystal panel holder 317 provided at the distal end of the out-plane rotary position adjuster 315.

The plan position adjuster 311 is for adjusting the advancement and retraction position and the plan position of the cross dichroic prism 150 relative to the light-incident surface 151, which includes a base 311A slidably provided on the platform 25, a leg 311B provided on the base 311A, and a connector 311C provided on the distal end of the leg 311B to which the in-plane rotary position adjuster 313 is connected.

The base 311A moves along the Z-axis (the right and left direction of FIG. 8) of the platform 25 driven by a driving mechanism (not shown) such as a motor. The leg 311B moves along the X-axis (the direction perpendicular to sheet surface of FIG. 8) relative to the base 311A driven by a driving mechanism (not shown) such as a motor provided on the side thereof. The connector moves along the Y-axis (the up and down direction of FIG. 8) relative to the leg 311B driven by a driving mechanism (not shown) such as a motor.

The in-plane rotary position adjuster 313 is for adjusting the in-plane rotary position of liquid crystal panels 141R, 141G and 141B relative to the light-incident surfaces 151 of the cross dichroic prism 150, which includes a base 313A fixed on the distal end of the plan position adjuster 311, and an in-plane rotary position adjuster 313B provided in a manner rotatable relative to the base 313A. The in-plane rotary position of the liquid crystal panels 141R, 141G and 141B relative to the light-incident surface 151 can be adjusted with high accuracy by adjusting the rotary position of the in-plane rotary position adjuster 313B.

The out-plane rotary position adjuster 315 is for adjusting the out-plane rotary position of the liquid crystal panels 141R, 141G and 141B relative to the light-incident surfaces 151 of the cross dichroic prism 150. The out-plane rotary position adjuster 315 is fixed on a distal end of the in-plane rotary position adjuster 313, which includes a base 315A of which the distal end is formed concave arc in horizontal direction, a first adjuster 315B of which the distal end is formed in the shape of concave arc in vertical direction and capable of sliding along the concave arc of the base 315A, and a second adjuster 315C capable of sliding along the concave arc of the first adjuster 315B.

When the motor (not shown) provided on the lateral side of the base 315A is rotated, the first adjuster 315B slides, and the second adjuster 315C slides when the motor (not shown) provided on a top side of the first adjuster 315B is rotated, so that the out-plane rotary position of the liquid crystal panels 141R, 141G and 141B relative to the light-incident surfaces 151 can be adjusted with high accuracy.

The liquid crystal panel holder 317 is for holding the liquid crystal panels 141R, 141G and 141B to be adjusted, which includes a fixed holding piece 317A fixed on the distal end of the second adjuster 315C, a movable holding piece 317B slidable on the distal end of the second adjuster 315C, and an actuator 317C for actuating the movable holding piece 317B. The liquid crystal panels 141R, 141G and 141B can be held by actuating the movable holding piece 317B driven by the actuator 317C. Further, by changing the initial sliding position of the movable holding piece 317B, the liquid crystal panels 141R, 141G and 141B of different size can be held.

Incidentally, the liquid crystal panel holder 317 may have, for instance, a porous suction plate with a suction opening formed thereon, where the respective liquid crystal panels 141R, 141G and 141B are held by contacting the suction opening to the respective liquid crystal panels 141R, 141G and 141B and vacuum-sucking the respective liquid crystal panels 141R, 141G and 141B through the suction opening. According to the above arrangement, the structure of the device itself can be simplified, and the size thereof can be minimized.

As shown in FIG. 6, the supporting jig 33 has a base plate 331 provided on the bottom plate 22, a leg 333 vertically mounted on the base plate 331, and a set plate 335 provided on the leg 333, to which the cross dichroic prism 150 and a below-described light-introducing portion 45 are attached.

As shown in FIG. 8, the light source unit 37 is provided between the fixed holding piece 317A and the movable holding piece 317B of the liquid crystal panel holder 317 provided to the six-axis position adjusting unit 31. The Light source unit 37 is for supplying the position-adjusting light beam and fixing light beam to the liquid crystal panels 141R, 141G and 141B, which includes a unit body 371 contacting to the liquid crystal panels 141R, 141G and 141B and four optical fibers 372 for supplying the respective light source lights to the unit body 371.

Figure 9A:
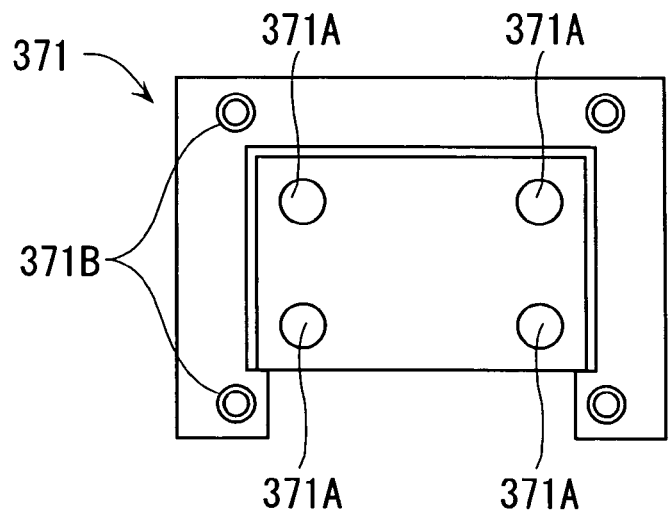
FIG. 9 is a front view showing an irradiating portion of an adjusting light source.

The base ends of the optical fibers 372 are connected to the adjusting light source device and the fixing light source device provided on the lower part of the platform 25. As shown in FIG. 9(A), on the contact surface of the unit body 371 to the liquid crystal panels 141R, 141G and 141B, adjusting light sources 371A located at a position corresponding to the corners of the rectangular image formation area of the liquid crystal panels 141R, 141G and 141B and fixing light sources 371B located outside of the image formation area to be in contact with the base ends of the pins 145 are provided.

Figure 9B:
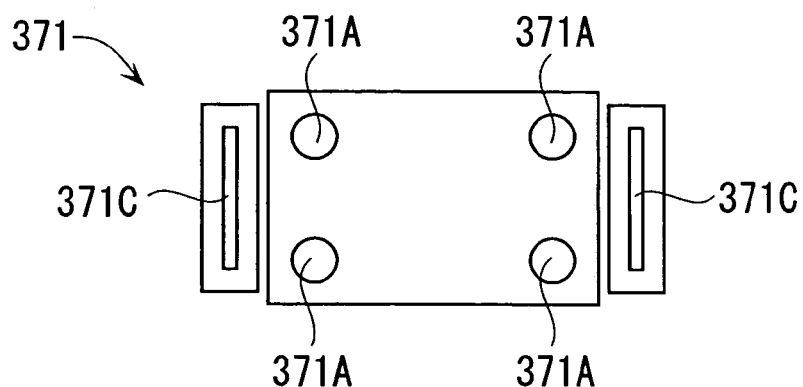
Figure 9C:
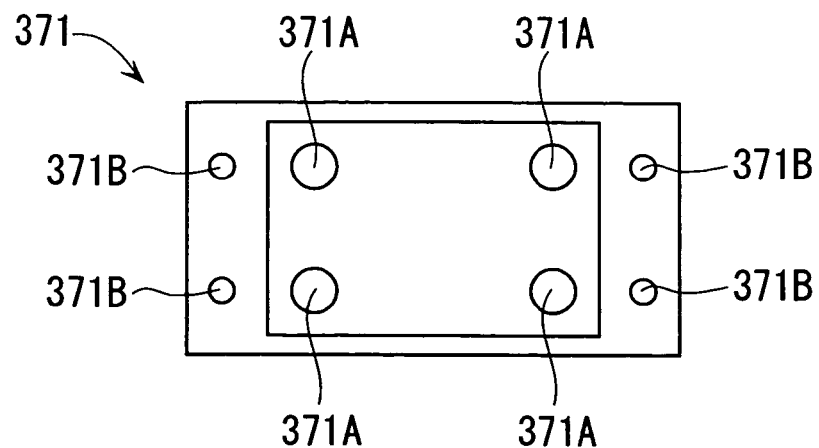

Incidentally, as well as the structure shown in FIG. 9(A), the unit body 371 that contacts the liquid crystal panels 141R, 141G and 141B may also have a structure in which the fixing light sources 371C are provided on the lateral sides of the adjusting light source 371A as shown in FIG. 9(B), or have a structure in which the fixing light sources 371B are provided in different way as shown in FIG. 9(C). By properly selecting the respective the unit bodies 371 in accordance with the different kinds of the liquid crystal panels 141R, 141G and 141B, the unit body 971 can be used for different liquid crystal panels having different fixing structure.

[1-4-2] Arrangement of Light-Beam Detector

As shown in FIG. 6, the light-beam detector 40 includes a CCD camera 41, a driving mechanism 43 capable of moving the CCD camera 41 three-dimensionally, and a light-introducing portion 45 attached to the supporting jig 33.

The CCD camera 41 is an area sensor having a CCD (Charge Coupled Device) as the image pickup element, which captures position-adjusting light beam irradiated from the cross dichroic prism 150 to output the light beam as an electrical signal.

Figure 10:
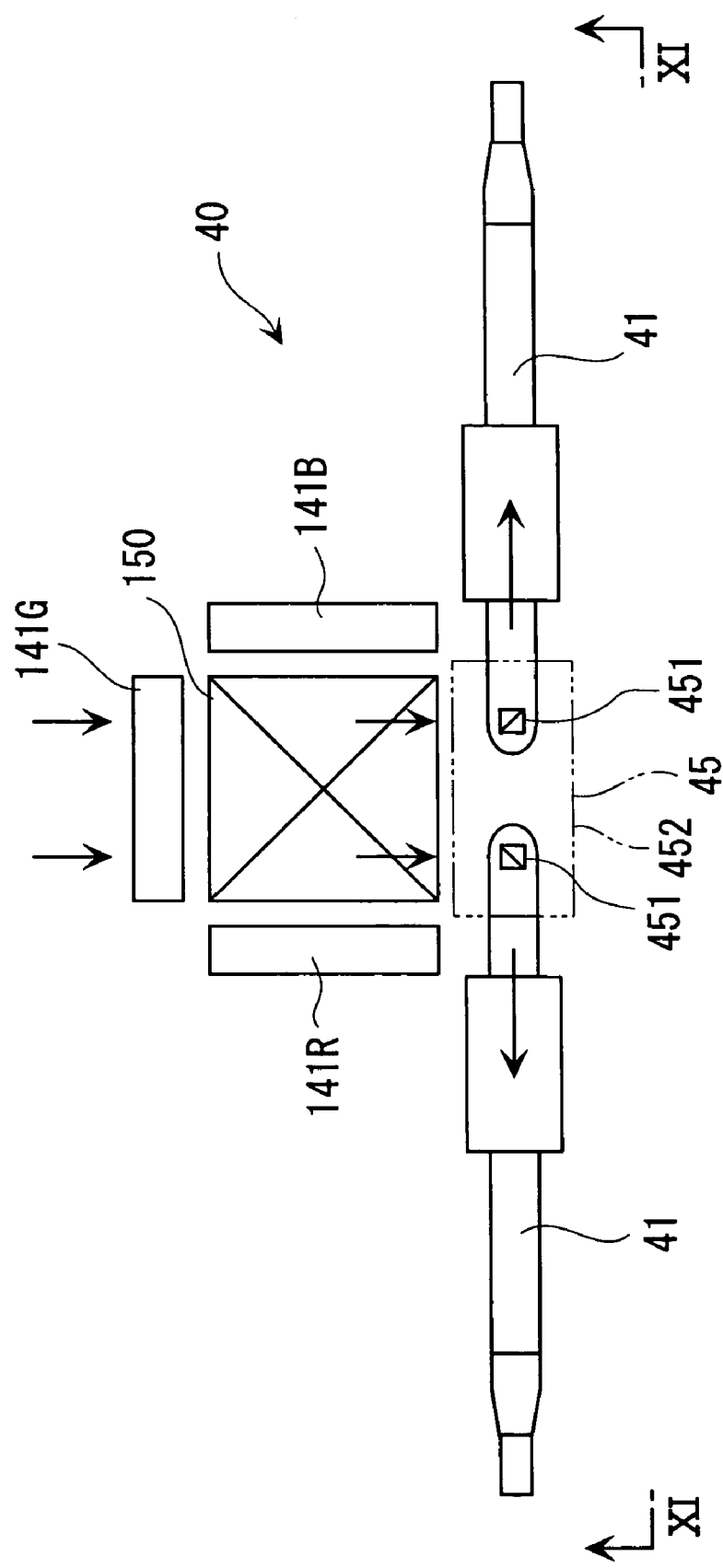
FIG. 10 is a plan view showing a light-beam detector of the position-adjusting device.

As shown in FIGS. 10 and 11, four CCD cameras 41 are provided around the light-introducing portion 45 along four directions through the driving mechanism 43 (FIG. 7). The CCD cameras 41 are provided in pairs on the diagonals of the rectangular image formation area of the liquid crystal panels 141R, 141G and 141B. Incidentally, in order for the CCD cameras 41 to detect the projection image with high accuracy, the zoom and focus of CCD camera can be adjusted by remote control.

Though not specifically illustrated, the driving mechanism 43 includes a column vertically mounted on the base plate 331 of the supporting jig 33, a plurality of shaft members provided to the column, and a camera-attaching portion provided on one of the shaft members, and is capable of moving the CCD cameras 41 along X-axis (the right and left direction of FIG. 11), Y-axis (the up and down direction of FIG. 11), and Z-axis (the direction perpendicular to sheet surface of FIG. 11) by a servo control mechanism inside the platform 25.

The light-introducing portion 45 includes four beam splitters 451 provided at the positions corresponding to the four corners of the rectangular image formation area of the liquid crystal panels 141R, 141G and 141B and a holding cover 452 for holding the respective beam splitters 451 at predetermined positions. The light-introducing portion 45 introduces the light beams, which are irradiated from the light source unit 37 into liquid crystal panels 141R, 141G and 141B to be irradiated from the cross dichroic prism 150, toward the CCD cameras 41 after being refracted by the beam splitters 451 by ninety degrees.

Incidentally, on the holding cover 452, proper openings are formed to allow the outwardly refracted light beam to pass through. In FIG. 10, the light beam is irradiated on the liquid crystal panel 141G. By the light-introducing portion 45, the light beams at the four corners irradiated from the cross dichroic prism 150 are directly detected by the CCD cameras 41 provided at the four positions without projecting the images on a screen or the like (direct-view method).

Figure 12:
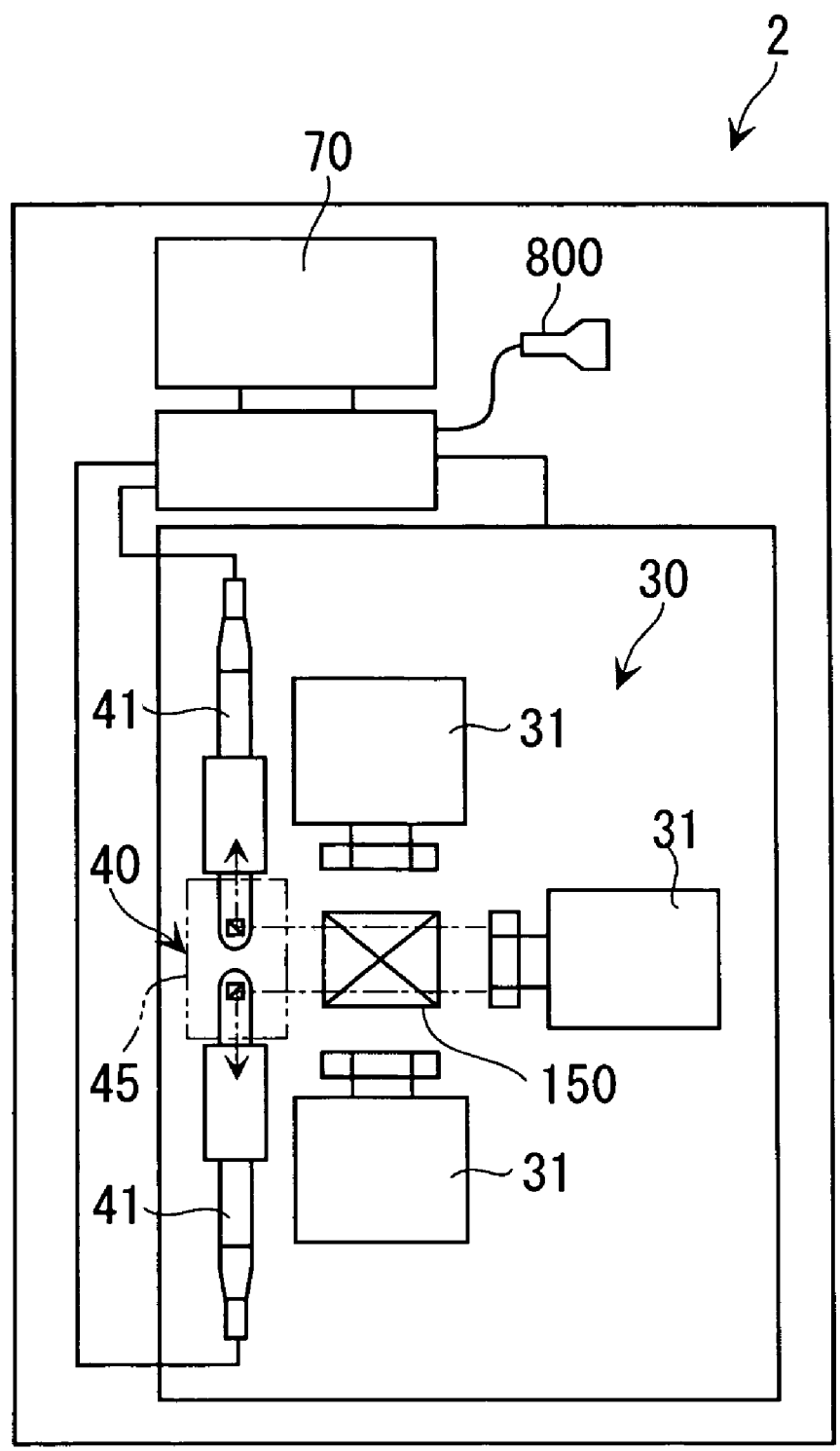
FIG. 12 is an illustration showing a computer for controlling the position-adjusting device.

As shown in FIG. 12, the adjuster body 30 and the light-beam detector 40 are electrically connected to the computer 70. Further, the computer 70 is also electrically connected to a bar-code reader 800 capable of reading the bar-code 601 (FIG. 3) indicated on the distribution label 600 attached to the projection lens 160.

The computer 70 has a CPU and a storage, which conducts operational control of the adjuster body 30 and the light-beam detector 40, image processing of the projection image captured by the CCD camera 41 of the light-beam detector 40, and processing the data read by the bar-code reader 800.

Figure 13:
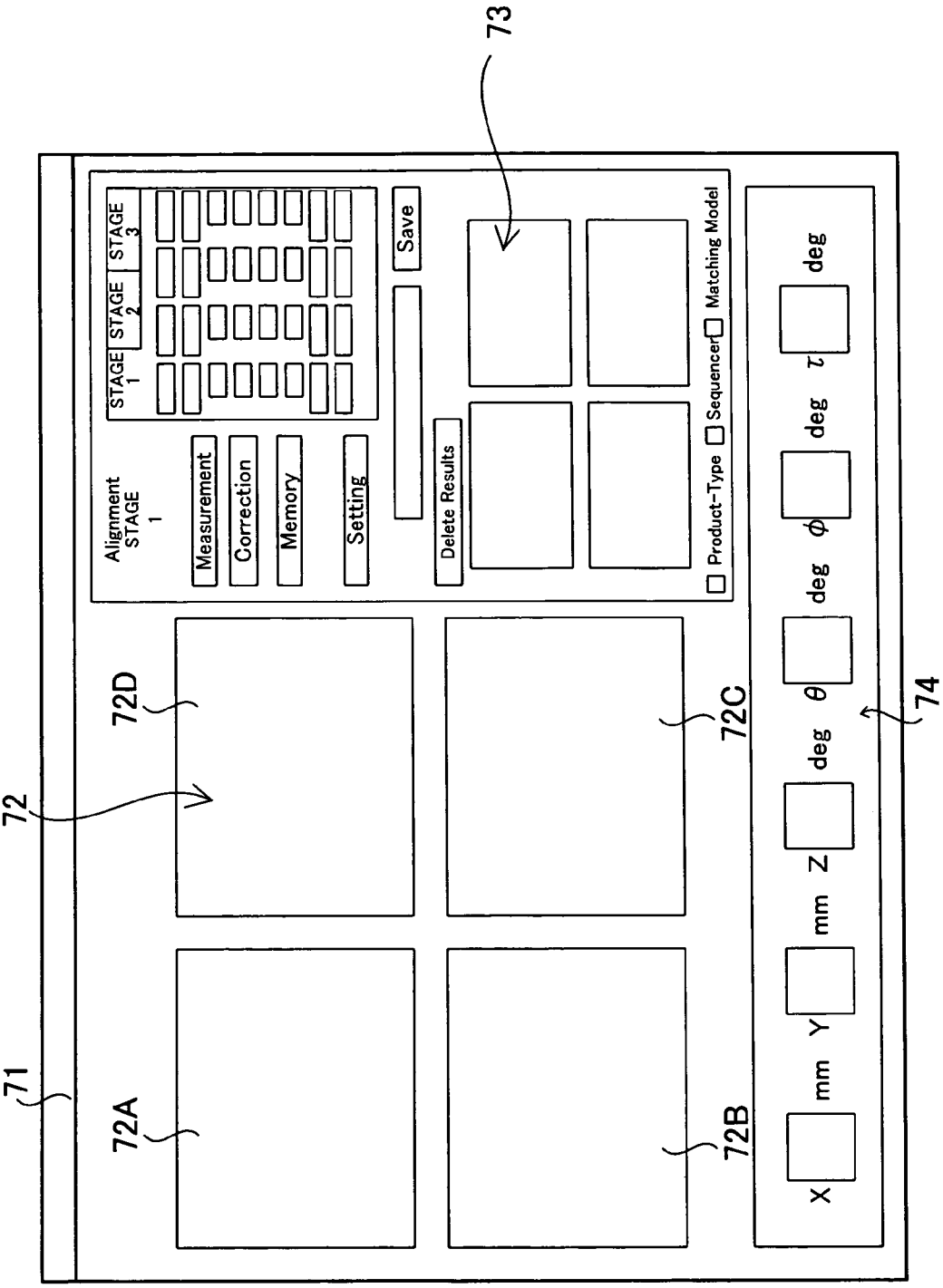
FIG. 13 is an illustration showing a display screen, on which a captured image is displayed.

The program called by the computer 70 displays a display screen 71 as shown in FIG. 13, and the focus and alignment are adjusted based on the various information displayed on the display screen 71.

The display screen 71 includes an image-displaying view 72 for directly displaying the images taken by the respective position-adjusted CCD cameras 41, an image-processing view 73 for pattern-matching processing of the images displayed on the image-displaying view 72 based on a reference pattern image, and an axes travel indicating view 74 for indicating the adjusting mount of the respective axes of the six-axis position adjusting unit 31 based on the results of the image processing. Incidentally, on the respective image-displaying areas 72A to 72D of the image-displaying view 72, the images obtained by the light beam at the four corners respectively captured by the four CCD cameras 41 are displayed.

[1-5] Adjusting Operation by Position-Adjusting Device

Figure 14:
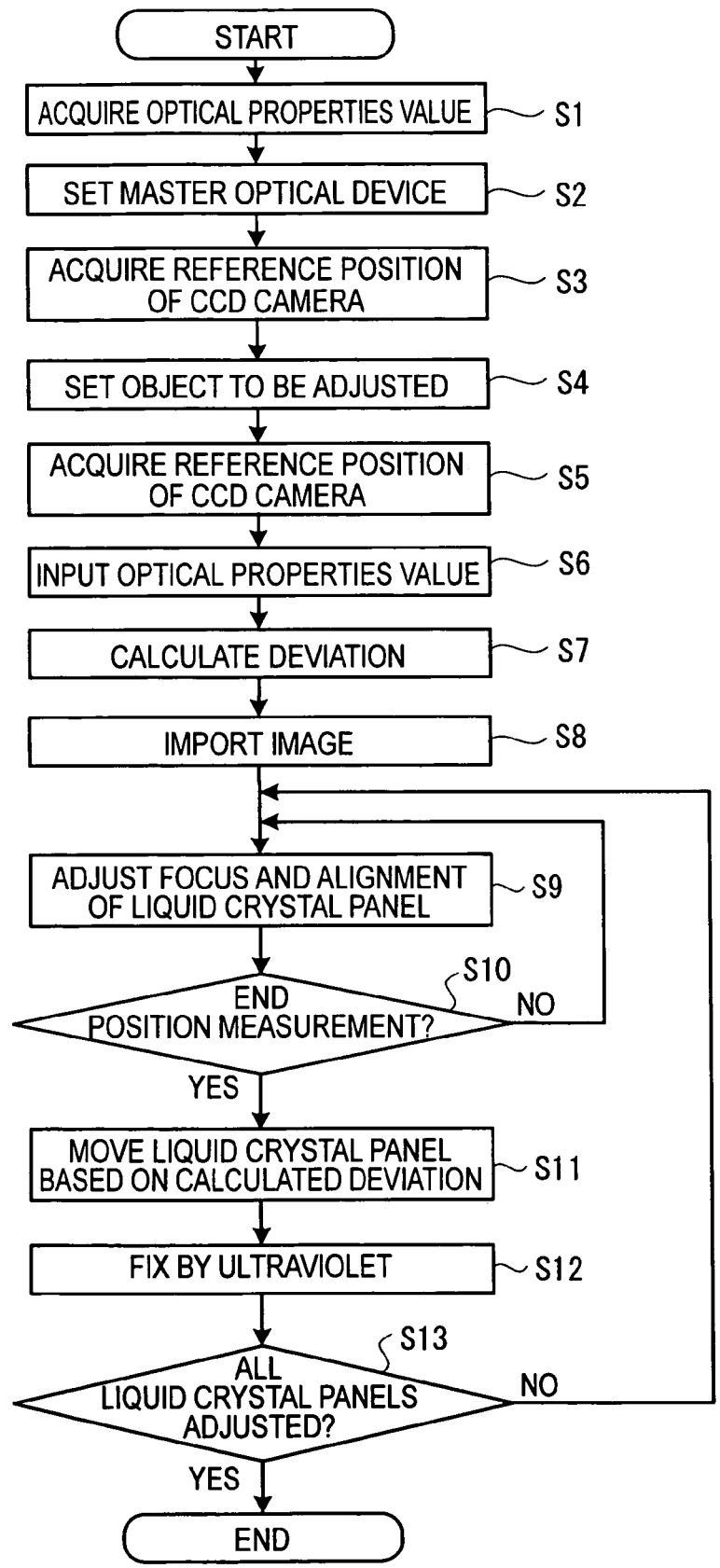
FIG. 14 is a flowchart showing position adjusting method of a first embodiment.

The position of the liquid crystal panels 141R, 141G and 141B is adjusted relative to the cross dichroic prism 150 by the position-adjusting device 2 will be described with reference to a flowchart shown in FIG. 14.

As the preparation before the position adjustment of the liquid crystal panels 141R, 141G and 141B, the optical property values of the projection lens 160 to be combined acquired in advance by the projection lens inspection device 3 as described above (step S1: optical properties acquiring step).

Further, as another preparation, the reference pattern for pattern-matching in accordance with the respective models of the projectors and the reference position of the CCD cameras 41 are previously acquired in advance (steps S2 and S3: reference position acquiring step).

Specifically, a master optical device of which focus position and alignment position are previously adjusted in accordance with the properties of the projection lens 160 for each model and the light-introducing portion 45 in which the positions of the beam splitters 451 are fixed corresponding to the size of the image formation area of the master optical device are set on the supporting jig 33 (step S2). The master optical device is a device formed by integrally combining three reference liquid crystal panels for respective color lights (reference optical modulator) to reference cross dichroic prism (reference color combining optical system).

Thereafter, the position-adjusting light beam is irradiated from the light source unit 37 to the liquid crystal panel for green light of the master optical device, and the light beam irradiated from the master optical device is directly fetched in by the CCD cameras 41 through the beam splitter 451. At this time, the driving mechanisms 43 are actuated to drive the CCD cameras 41 to a position where the light beams can be securely received (step S3). Further, the captured images are respectively displayed on the image-displaying areas 72A to 72D of the image-displaying view 72.

Figure 15:
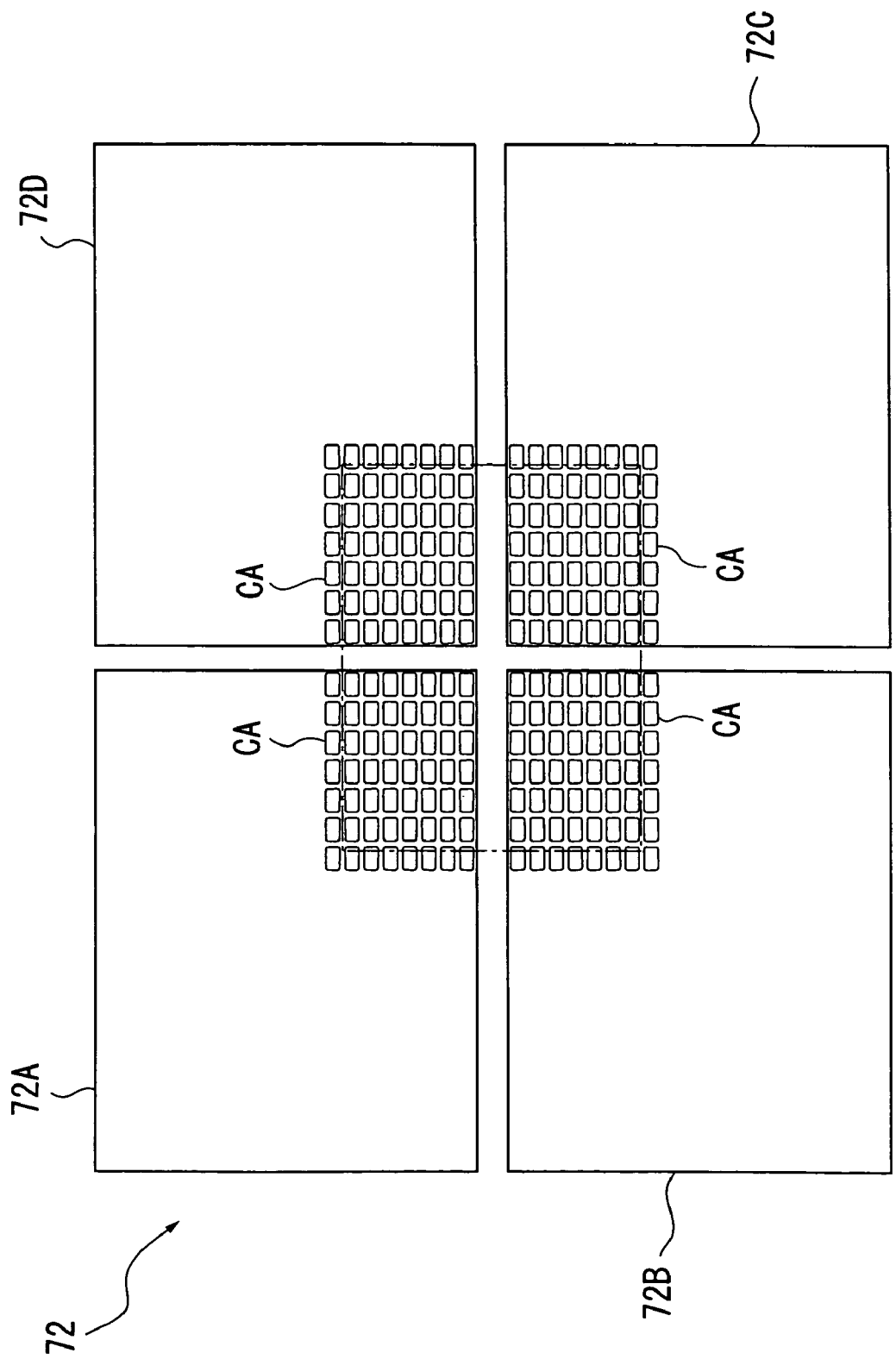
FIG. 15 is an illustration showing a reference pattern on the display screen.

The images include, for instance, a plurality of pixel areas CA corresponding to the four corners of the reference liquid crystal panel as shown in FIG. 15. The images are used as the reference pattern for pattern-matching. Further, the positions of the CCD cameras 41 at this time are the reference positions corresponding to the model. The reference patterns are generated respectively for each of the three reference liquid crystal panels, and the setting of the reference positions of the CCD cameras 41 is conducted for one reference liquid crystal panel only. Such reference patterns and reference positions of the CCD cameras 41 are registered in the storage of the computer 70 as the model data corresponding to the model.

The above steps 2 and 3 are conducted for a plurality of models in advance and the reference pattern for each model and reference positions of the CCD camera 41 are stored as the model data.

Thereafter, the cross dichroic prism 150 is set to the supporting jig 33, and the liquid crystal panels 141R, 141G and 141B, with the pins 145 applied with the ultraviolet curing adhesive inserted thereto, are attached to the liquid crystal panel holder 317 of the six-axis position adjusting unit 31 (step S4).

Thereafter, prior to the actual adjustment, an initialization processing is conducted by a program executed by the CPU of the computer 70. The initialization processing is not only for initializing the memories such as the RAM (Random Access Memory), but also for calling the model data of the cross dichroic prism 150 and the liquid crystal panels 141R, 141G and 141B previously registered corresponding to the model to move and set the CCD camera 41 to the reference positions, and for disposing the liquid crystal panels 141R, 141G and 141B to a predetermined designed positions so that the position thereof can be adjusted (step S5). Incidentally, the step may be conducted right after the above step S2.

The optical property values measured by the projection lens inspection device 3 in advance are acquired. Specifically, the data of the bar-code 601 of the distribution label 600 attached to the projection lens 160 to be combined to an actual product, is read by the bar-code reader 800, and the optical properties including the axial chromatic aberration and the inclination of the image are inputted to the memory of the computer 70 (step S6).

Thereafter, the deviation of the liquid crystal panels 141R, 141G and 141B relative to the reference position is calculated by the computer 70 based on the inputted optical property values (step S7: deviation calculating step).

Thereafter, the position-adjusting light beam is irradiated onto the liquid crystal panel 141G, and the combined light beam irradiated from the light-irradiation surface 152 of the cross dichroic prism 150 is detected by the CCD cameras 41 through the beam splitter 451 (step S8: combined light detecting step).

The computer 70, by using the image processing function thereof, adjusts the focus and alignment of the liquid crystal panel 141G by advancing and retracting the liquid crystal panel 141G relative to the light-incident surface 151 of the cross dichroic prism 150 while the signal caught from the CCD camera 41 is inputted (step S9: optical modulator position-adjusting step). The focus and alignment adjustments are repeated until the images displayed on the image-displaying area 72A to 72D and the images of the reference patterns are completely matched (step S10).

Thereafter, the driving mechanism 43 moves the liquid crystal panel 141G along the optical axis of the projection lens 160 (i.e. the advancement and retraction direction of the cross dichroic prism 150 toward the light-incident surface 151) for a predetermined distance based on the calculated deviation (step S11: optical modulator position-adjusting step). The variation in distance among the projection lenses 160 are thus corrected to improve the position accuracy of the liquid crystal panel 141G.

After completing the focus and alignment adjustments, ultraviolet is irradiate on the pins 145 to fix the liquid crystal panel 141G (step S12).

Further, after completing the adjustment of the liquid crystal panel 141G, the other liquid crystal panels 141R and 141B are adjusted in the same manner. In other words, the above steps are successively conducted for the liquid crystal panels 141R and 141B (step S13). During the process, the reference pattern corresponding to the liquid crystal panels 141R and 141B are fetched from the storage to be used.

[1-6] Advantages of the First Embodiment

According to the present embodiment, following advantages can be obtained.

(1) Since the position of the liquid crystal panels 141R, 141G and 141B relative to the cross dichroic prism 150 is corrected in accordance with the optical properties of the projection lens 160, the optical device 180 in which the relative positions between the liquid crystal panels 141R, 141G and 141B and the cross dichroic prism 150 are adjusted with high accuracy can be obtained. Accordingly, when the projection lens 160 is combined with the optical device 180, a clear projection image can be obtained. Since the optical device 180 is constituted considering the optical properties of all the projection lenses 160, as a result, all the projection lenses 160 are checked. Accordingly, the quality of the projection lens 160 itself also can be determined.

(2) Since the liquid crystal panels 141R, 141G and 141B are adjusted while the CCD cameras 41 are kept at the reference positions, and are moved by the distance equivalent to the deviation of the projection lens 160, the adjustment can be quickly conducted.

(3) Since the optical property values of the projection lens 160 are acquired while the distribution label 600 recording optical property values the projection lens 160 is attached thereon, the projection lens 160 and the specific optical property values of the projection lens 160 are handled together, so that inputting error in the optical properties acquiring step can be prevented and the efficiency in the production process can be improved.

(4) Since the optical property values of the projection lens 160 are coded as the bar-code 601, the optical property values can be easily inputted by providing the bar-code reader 800 to the position-adjusting device 2.

(5) Since the light-introducing portion 45 having the beam splitters 451 is used, the light beams irradiated from the cross dichroic prism 150 can be refracted by ninety degrees, so that the CCD cameras 41 can be disposed around the cross dichroic prism 150. Accordingly, since it is not necessary to dispose the CCD cameras 41 in the irradiation direction of the cross dichroic prism 150, the size-enlargement dimension of the position-adjusting device 2 in the irradiation direction can be prevented and the size of the position-adjusting device 2 can be reduced.

(6) Since the light-introducing portion 45 is constructed using the beam splitters 451, the structure of the light-introducing portion 45 can be simplified while keeping enough function. Further, since the manufacturing cost is low, even if the light-introducing portions 45 are prepared for all models, the economic cost will not go high.

(7) Since the light-beam detector 40 is constituted by the four CCD cameras 41, the images of the four corners of the liquid crystal panels 141R, 141G and 141B can be separately captured by the respective CCD cameras 41 and can be displayed on the image-displaying areas 72A to 72D. Accordingly, the focus and alignment on all the image-taken points can be adjusted while monitoring the images on the image-displaying area 72A to 72D, so that the adjustment can be conducted with high accuracy.

(8) Since the four CCD cameras 41 are disposed in pairs on the diagonals of the rectangular image formation area of the liquid crystal panels 141R, 141G and 141B, the interference between the CCD cameras 41 can be avoided and the driving mechanism 43 can be disposed in the wide space between the CCD camera 41.

(9) Since the position adjustment is repeated for each of the liquid crystal panels 141R, 141G and 141B, the CCD cameras 41 can be commonly used in adjusting the position of the liquid crystal panels 141R, 141G and 141B, so that the liquid crystal panels 141R, 141G and 141B can be adjusted by a small number of (four) CCD cameras 41.

[2] Second Embodiment

A second embodiment of the present invention will be described below.

The second embodiment differs from the first embodiment in the position-adjusting method of the respective liquid crystal panels 141R, 141G and 141B based on the deviation calculated by the optical property values of each projection lens 160. Accordingly, the same codes will be used for the same or equivalent components to that of the first embodiment, and the description thereof will be omitted or briefed.

Figure 16:
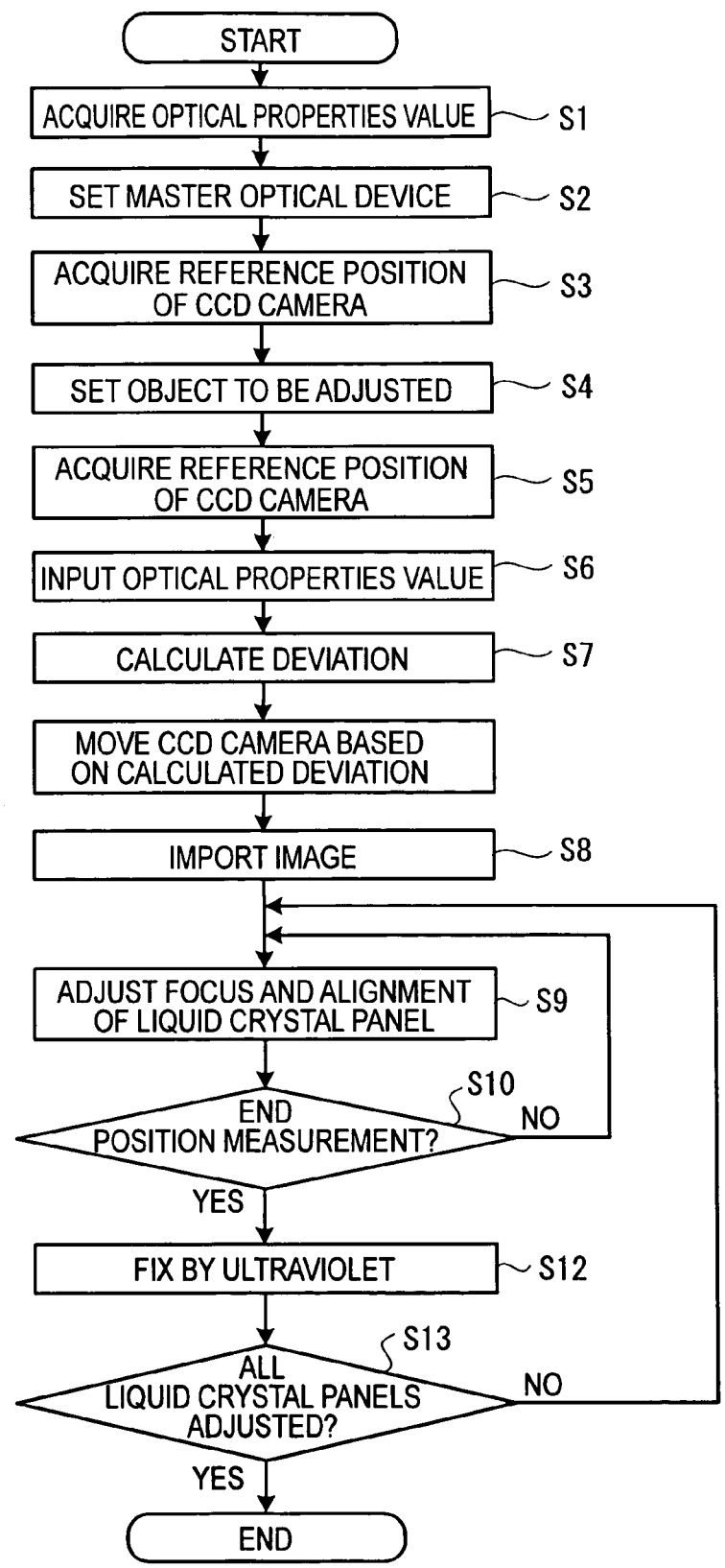
FIG. 16 is a flowchart showing a position adjusting method of a second embodiment.

The liquid crystal panels 141R, 141G and 141B of the second embodiment is adjusted following the flowchart shown in FIG. 16. However, since the steps S1 to S7, S8 to S10, S12 and S13 are the same as those of the first embodiment, only the step S14, which is different from the first embodiment, will be described.

In the step S14, the position of the respective CCD cameras 41 relative to the light-irradiation surface 152 of the cross dichroic prism 150 is adjusted based on the deviation calculated in the step S7 (step S14: optical modulator position-adjusting step). Accordingly, the variation in distance among the projection lenses 160 can be corrected.

Thereafter, while the position-adjusted CCD cameras 41 are fixed, the position of the liquid crystal panel 141G is adjusted according to the same steps as in the first embodiment (steps S8 to S10, S12 and S13).

According to the present embodiment, the following advantage can be obtained as well as the same advantages as (1) and (3) to (9) of the first embodiment.

(10) Since the respective liquid crystal panels 141R, 141G and 141B are adjusted after the CCD cameras 41 are set based on the deviation of the projection lens 160, the position of the CCD cameras 41 can be set with high accuracy. At this time, since the four CCD cameras 41 are individually advanced and retracted in accordance with the deviation of the optical property values of the respective positions, the deviation of the projection lens 160 can be easily corrected with high accuracy.

[3] Third Embodiment

A third embodiment of the present invention will be described below.

[3-1] General Arrangement

Figure 18:
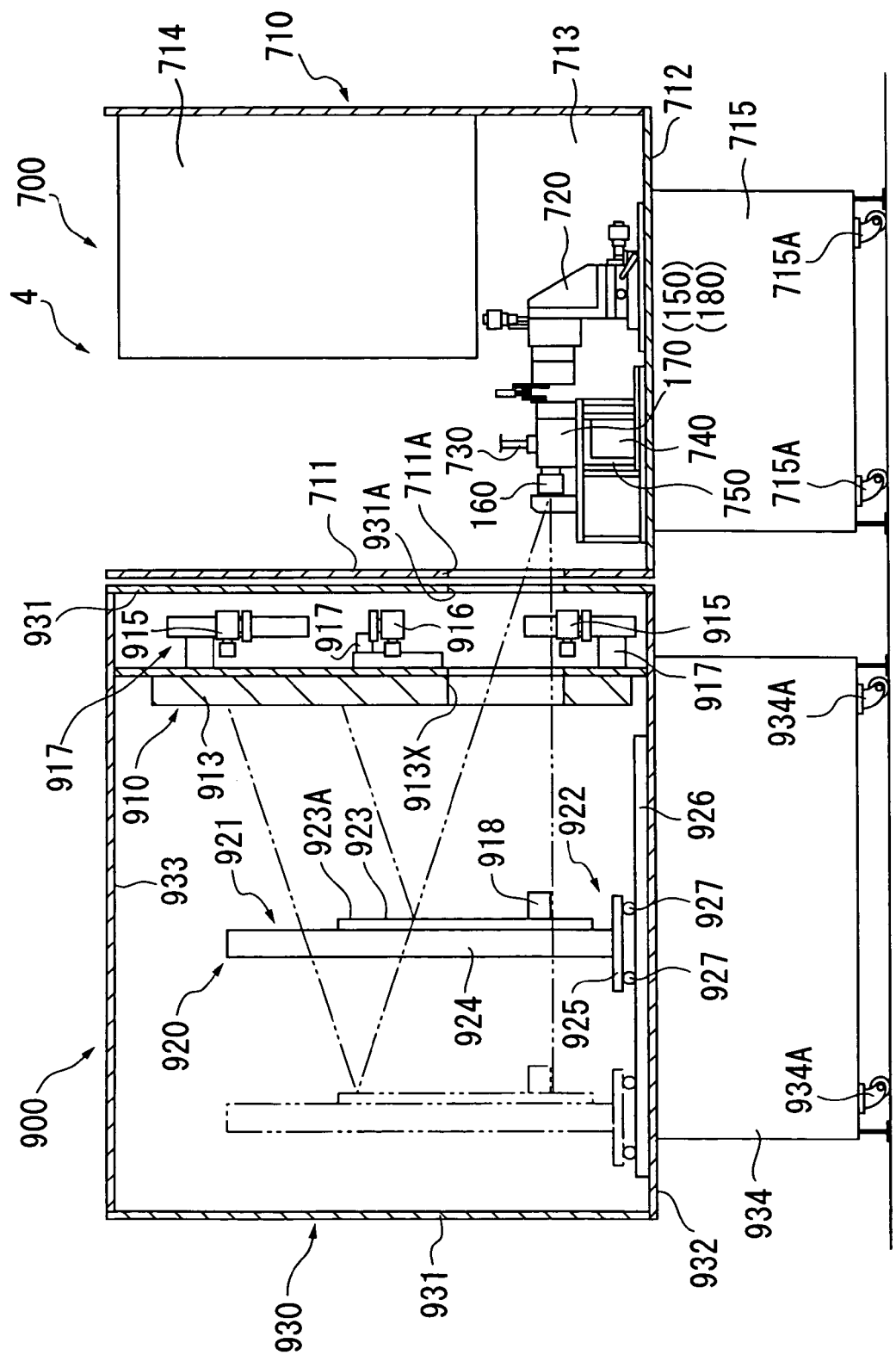
FIG. 18 is a side view showing a position-adjusting system according to a third embodiment.
Figure 19:
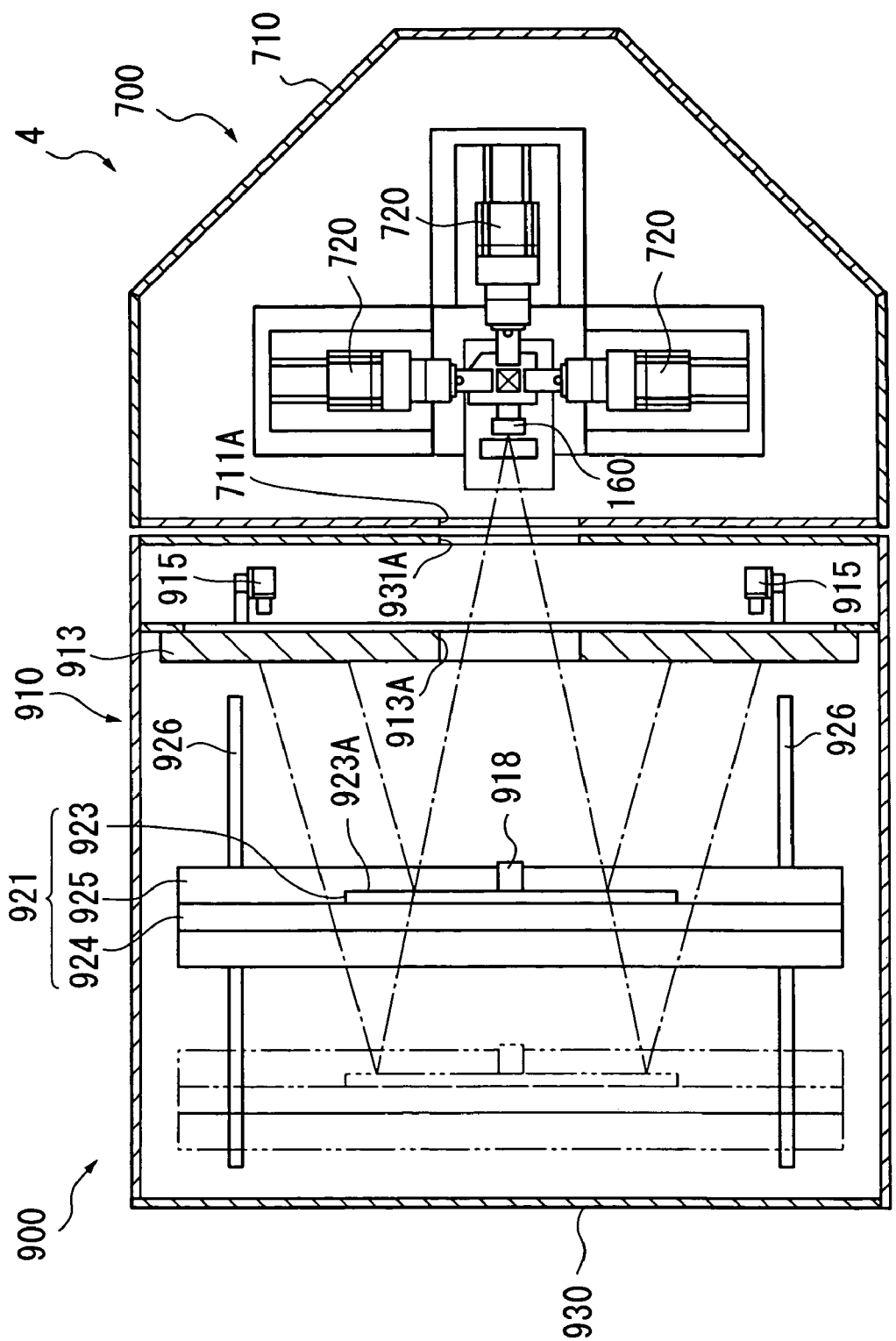
FIG. 19 is a plan view of the position-adjusting system.

FIGS. 18 and 19 show a position-adjusting system 4 for adjusting the position of the liquid crystal panels 141R, 141G and 141B relative to the cross dichroic prism 150 of the optical unit. The position-adjusting system 4 includes an adjuster body 700 and a projecting portion body 900.

The adjuster body 700 has a platform 750 for mounting the optical unit 170 including the optical device 180, a UV-shielding cover 710, the three six-axis position adjusting units 720 for adjusting the positions of the liquid crystal panels 141R, 141G and 141B, a prism position adjusting unit 730 for adjusting the position of the cross dichroic prism 150, and a light source unit 740 for irradiating a white laser-beam for determining the position of the optical axis and the adjusting light.

The UV-shielding cover 710 has a structure approximately the same as the aforesaid UV-shielding cover 20, which includes a side plate 711 for surrounding the six-axis position adjusting unit 720, a bottom plate 712, a door 714 provided on the side plate 713 7enabled to be opened and closed, and a mount base 715 provided on the lower part thereof.

Provided on the side plate 711 is a transmitting window 711A for transmitting the light irradiated from the light source unit 740 through the projection lens 160 to the projecting portion body 900.

The door 714 is provided for supplying and removing the optical unit 170 to be adjusted and for adjusting the six-axis position adjusting unit 720, and is made of acrylic resin that transmits no ultraviolet light.

The mount base 715 is provided with casters 715A at the bottom for easily moving the adjuster body 700 in installing the apparatus.

The projecting portion body 900 includes a screen unit 910, a reflector 920, and a darkroom 930.

The darkroom 930 includes a side plate 931, a bottom plate 932 and a top plate 933 that surrounds the screen unit 910 and the reflector 920, and a mount 934.

A transmitting window 931A for transmitting the light irradiated from the light source unit 740 through the optical unit 170 is provided on the side plate 931. Casters 934A are provided on the lower side of the mount 934.

[3-2] Description of Adjuster Body 700

Inside the UV-shielding cover 710 of the adjuster body 700, a six-axis position adjusting unit 720 and a platform 750 for supporting the optical unit 170 to be adjusted are provided. A light source unit 740 is provided under a mount surface of the platform 750 upon which the optical unit 170 is mounted. Provided on the platform 750 of the adjuster body 700 is a prism position adjusting unit 730 capable of three-dimensional movement.

Incidentally, although not shown in FIG. 18, a computer 200 (described below) as a controller for controlling the adjuster body 700, the screen unit 910 and the reflector 920, and a fixing ultraviolet light source device for curing the ultraviolet-curing adhesive to fix the liquid crystal panels 141R, 141G and 141B of the optical unit 170 to the cross dichroic prism 150 are provided on the lower part of the mount base 715.

Figure 20:
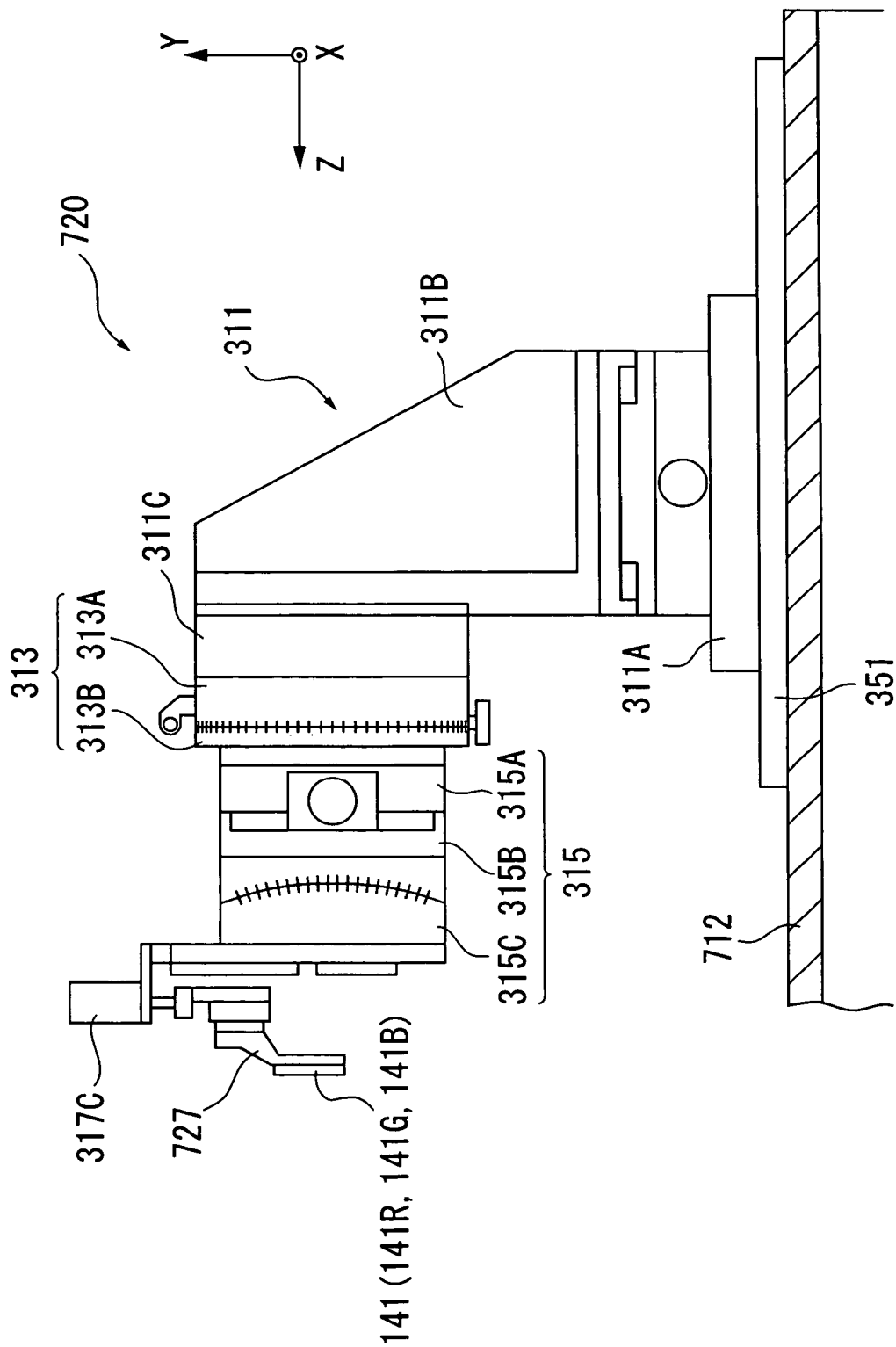
FIG. 20 is a side view showing a part of the position-adjusting system.

As shown in FIG. 20, the six-axis position adjusting unit 720 has approximately the same structure as the six-axis position adjusting unit 31 except for the liquid crystal panel holder. A liquid crystal panel holder 727 provided at the distal end of the second adjuster 315C holds the liquid crystal panels 141R, 141G and 141B to be adjusted, which is movable along the Y-axis actuated by an actuator 317C provided in the second adjuster 315C.

Figure 21:
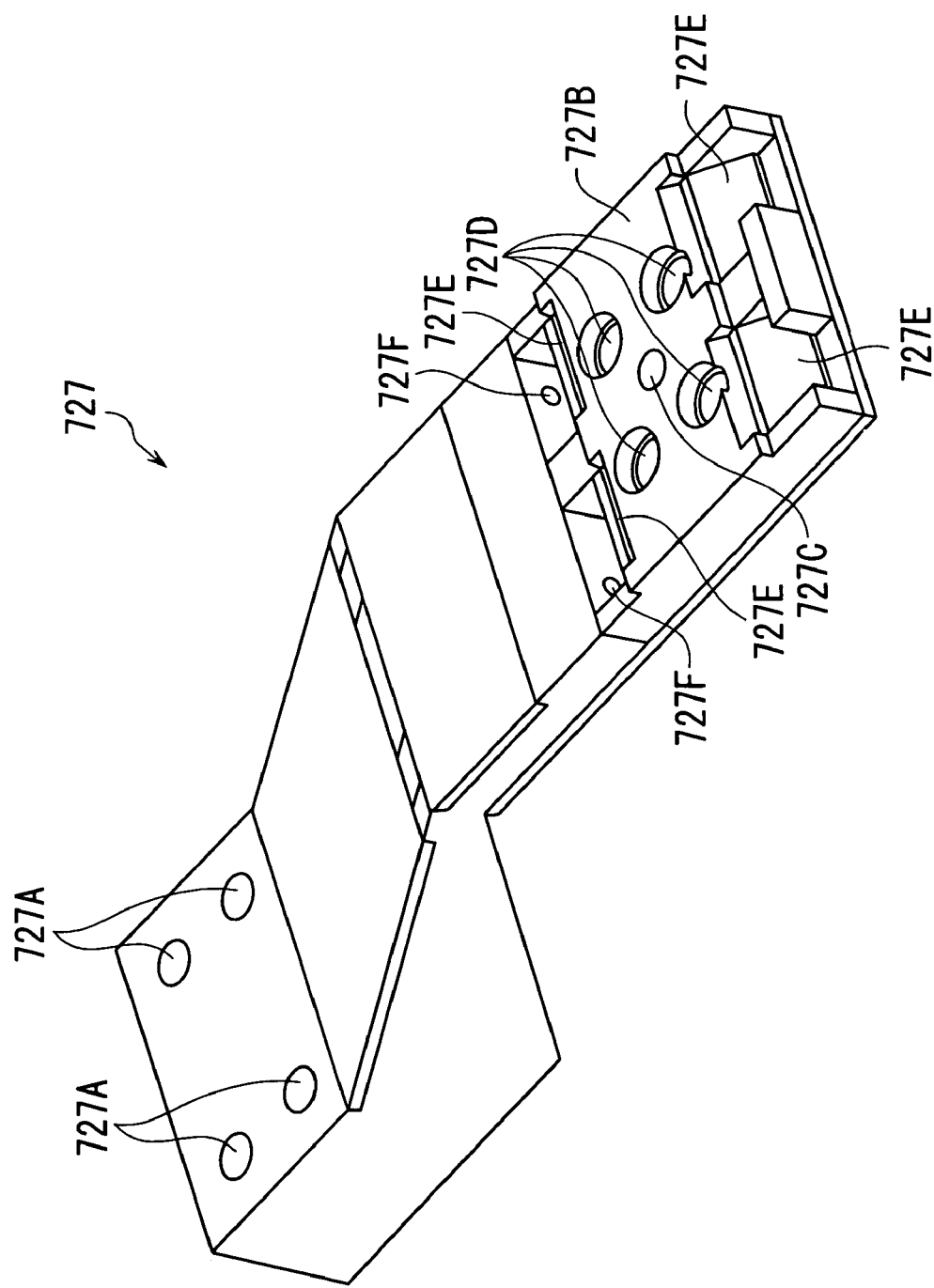
FIG. 21 is an illustration showing a liquid crystal panel holder of the position-adjusting system.

As shown in FIG. 21, the liquid crystal panel holder 727 is a plate-shaped metal component having an approximately Z-shape side, which has holes 727A for the attachment with the second adjustor 315C at the base end thereof (upper left side of the drawing), a suction surface 727B for sucking the image formation area of the liquid crystal panels 141R, 141G and 141B at the distal end thereof (lower right side of the drawing), a suction hole 727C formed approximately at the center of the suction surface 727B for sucking the air, and four light-beam transmitting holes 727D formed on the suction surface 727B and penetrating the liquid crystal panel holder 727 from front face to back face. Further, four mirrors 727E are provided obliquely at an angle of forty-five degrees relative to the suction surface 727B on the upper and lower sides of the suction surface 727B, and two holes 727F for irradiating ultraviolet are formed at a position corresponding to the upper two mirrors 727E of the holder 727. Incidentally, the light-beam transmitting holes 727D are formed at a position where the light beams are introduced on the four corners of the image formation area of the liquid crystal panels 141R, 141G and 141B.

Figure 22:
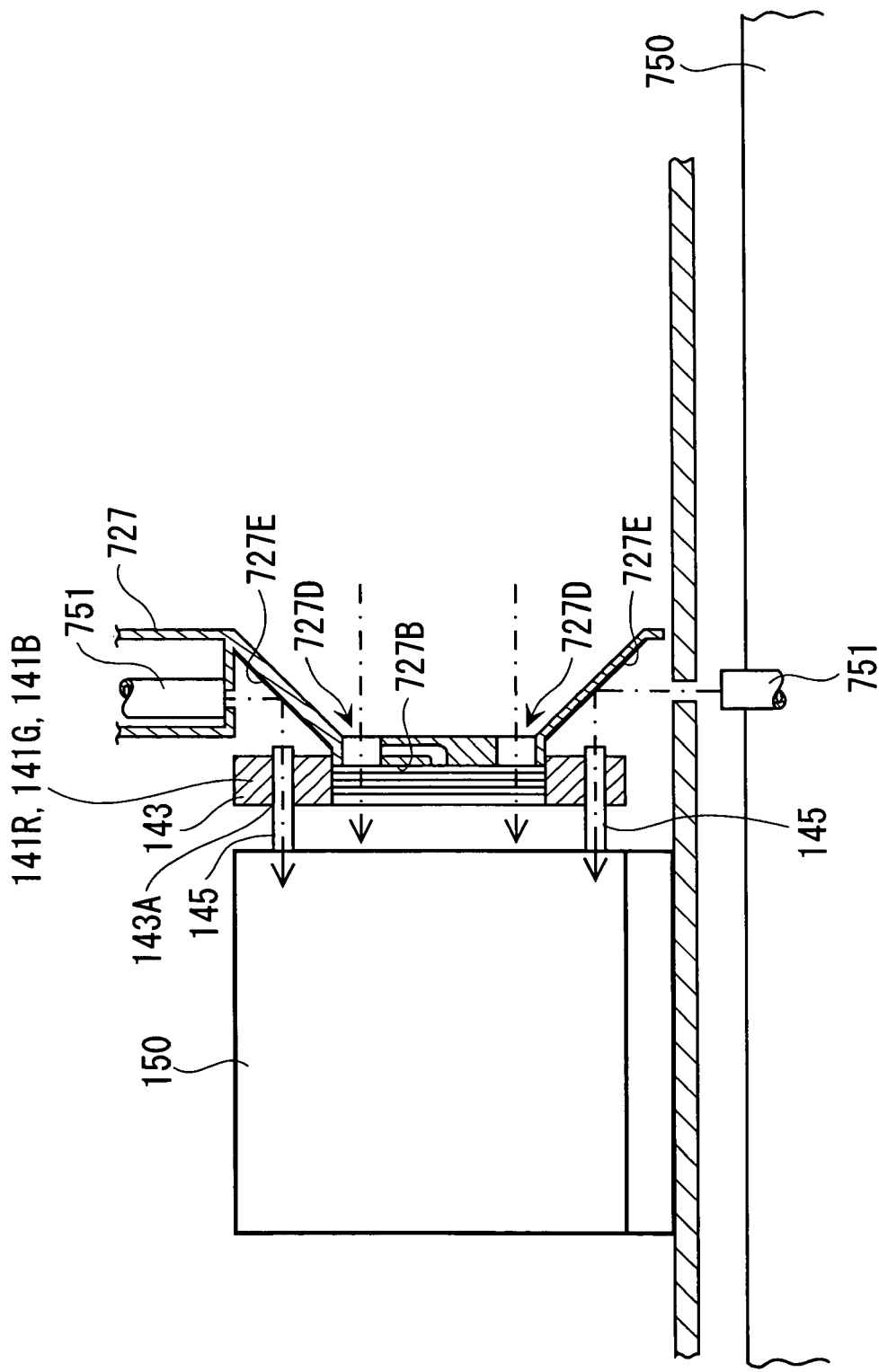
FIG. 22 is an illustration showing a side portion of the liquid crystal panel holder.

As shown in FIG. 22, the liquid crystal panel holder 727 holds the liquid crystal panels 141R, 141G and 141B in the state that the image formation area of the liquid crystal panels 141R, 141G and 141B is sucked on the suction surface 727B. The light-beam transmitting holes 727D transmits the light beams irradiated from the light source unit 740 and passing through the light guide along the illuminating optical axis to be incident on the image formation area of the liquid crystal panels 141R, 141G and 141B. Further, the ultraviolet irradiated by the optical fibers 751 projecting from the platform 750 and the optical fibers 751 provided inside the liquid crystal panel holder 727 is incident onto the mirrors 727E, and the ultraviolet reflected by respective mirrors 727E is incident onto the base end of the pins 145 to cure the ultraviolet curing adhesive coated on the inside of the holes 143A formed on the holding frame 143 of the liquid crystal panels 141R, 141G and 141B.

Figure 23:
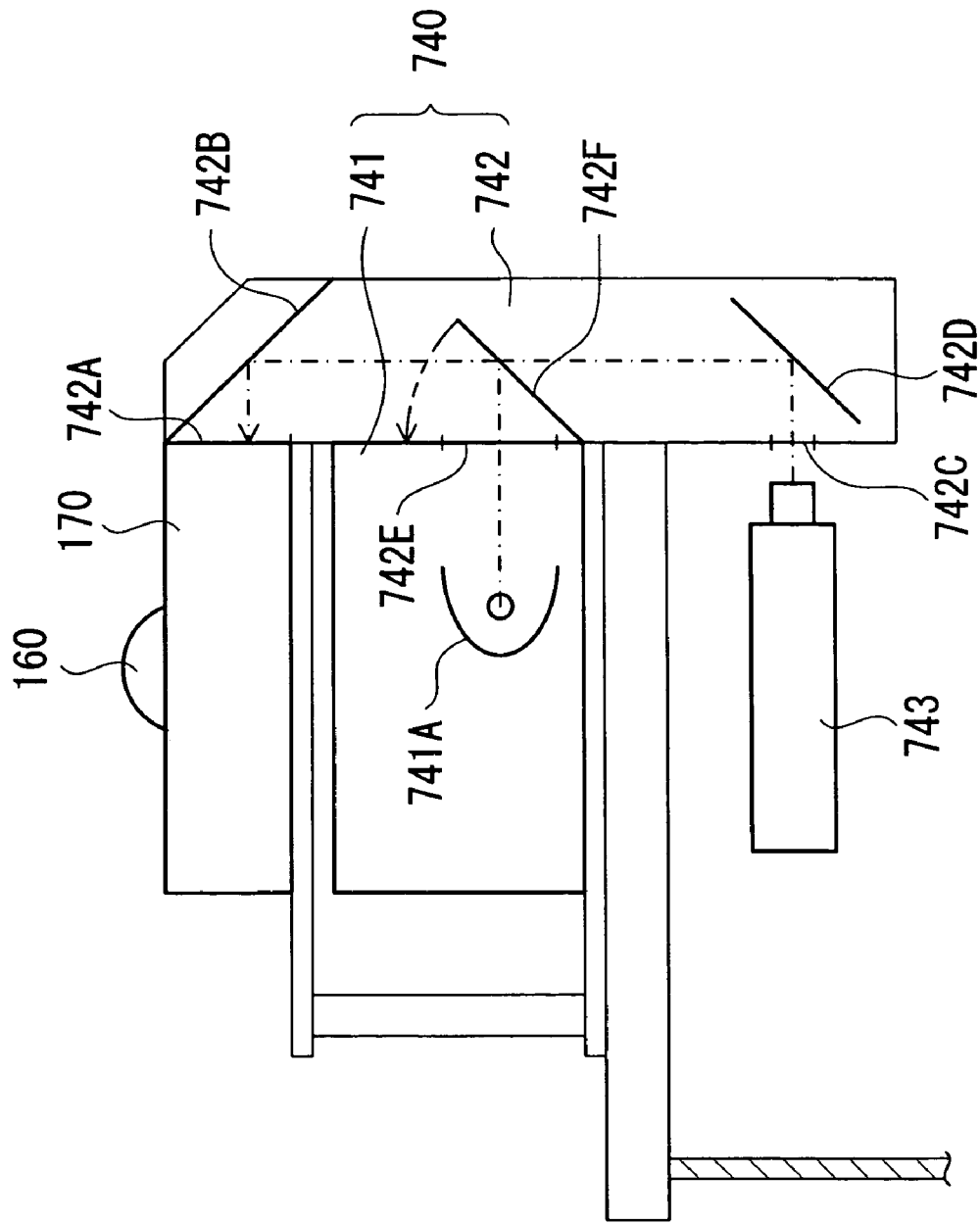
FIG. 23 is a schematic illustration showing the structure of the adjusting light source and the laser beamer.

The light source unit 740 has a light source for adjusting the positions of the cross dichroic prism 150 and the liquid crystal panels 141R, 141G and 141B, which includes a light source body 741 and a light-introducing portion 742 as shown in FIG. 23.

The light source body 741 includes a light source lamp 741A (an adjusting light source) accommodated in a casing, which supplies the light beam to the optical unit 170. Although not shown in the drawing, an opening for cooling the light source lamp 741A and a cooling fan inside the opening are provided on the casing. Incidentally, the on/off (shutter) of the light source lamp 741A is controlled by the below-described computer 200.

The light-introducing portion 742 is a vertically extending tube, which has an opening 742A at a side of the upper end thereof, and a mirror 742B disposed obliquely at an angle of forty-five degrees relative to the aperture of the opening 742A is provided inside the light-introducing portion 742 corresponding to the position of the opening 742A.

The lower end of the light-introducing portion 742 extends to the lower part of the mount base 715, and an opening 742C is formed on the side face of the lower end opposite to the irradiation portion of the laser beamer 743 provided on the lower part of the mount base 715. Further, a mirror 742D is provided inside the light-introducing portion 742 in the position corresponding to the opening 742C obliquely at an angle of forty-five degrees relative to the aperture of the opening 742C.

An opening 742E is formed in the middle of the light-introducing portion 742 at a position corresponding to the light-irradiating portion of the light source lamp 741A, and a movable mirror 742F capable of adjusting the angle thereof within a range of zero to forty-five degrees relative to the aperture of the opening 742E is disposed inside the light-introducing portion 742 corresponding to the opening 742.

When the optical unit 170 is adjusted using the light source unit 740, the opening 742A at the upper end of the light-introducing portion 742 is contacted to the light source lamp replacing opening of the optical unit 170, and the light beam irradiated from the light source lamp 741A of the light source body 741 and the laser beamer 743 are introduced into the light guide to adjust the position of the cross dichroic prism 150 and the liquid crystal panels 141R, 141G and 141B.

Specifically, when the white laser-beam is introduced into the optical unit 170, in the state that the movable mirror 742F is aligned with the opening 742E, i.e. the movable mirror 742F is moved to be at zero degree relative to the aperture of the opening 742E, the white laser-beam is irradiated from the laser beamer 743 to adjust the position of the cross dichroic prism 150 and to notify the optical axis position of the optical unit 170 itself to the computer. When the movable mirror 742F is incident by forty-five degrees, the adjusting light beam is irradiated from the light source lamp 741A of the light source body 741 to adjust the focus and alignment of the liquid crystal panels 141R, 141G and 141B.

Figure 24:
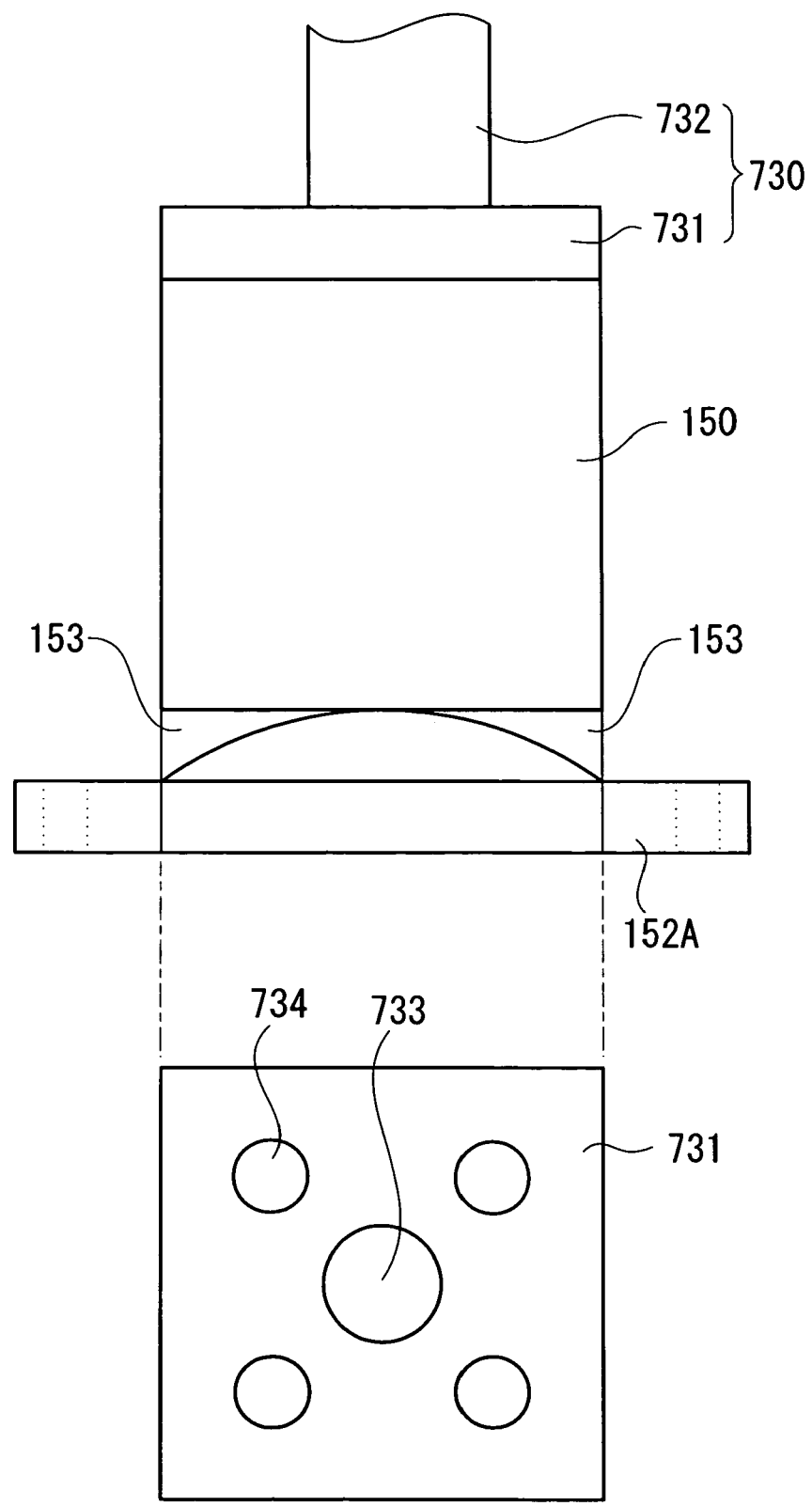
FIG. 24 is an illustration showing how a position of a cross dichroic prism is adjusted.

As shown in FIG. 24, the prism position adjusting unit 730 adjusts the position of the cross dichroic prism 150, which includes a prism holder 731 for holding cross dichroic prism 150 by suction, and a drive shaft 732 connected to the prism holder 731 at the distal end thereof and a driving mechanism (not shown) at the base end thereof.

The prism holder 731 has a surface shaped approximately the same as that of the cross dichroic prism 150, which sucks the upper surface of the cross dichroic prism 150 to adjust the position of the cross dichroic prism 150. Accordingly, a suction hole 733 is formed on the surface of the prism holder 731 contacting the cross dichroic prism 150.

Further, ultraviolet irradiators 734 are formed on the contact surface for, after completing the position adjustment by the prism position adjusting unit 730, irradiating ultraviolet from the ultraviolet irradiator 734 toward the ultraviolet curing adhesive 153 on the lower side through the cross dichroic prism 150.

The drive shaft 732 is driven by a motor or the like for adjusting the attitude of the prism holder 731, which is capable of three-dimensionally freely adjusting the position of the cross dichroic prism 150 sucked by the prism holder 731.

[3-3] Description of Projecting Portion Body 900

As shown in FIG. 18, the screen unit 910 and the reflector 920 of the projecting portion body 900 are opposed with each other inside the darkroom 930.

The screen unit 910 is provided on a side close to the six-axis position adjusting unit 720 inside the darkroom 930, which includes a light-transmissive screen 913 (projection surface of the optical unit 170) provided on the upper surface of the bottom plate 932 of the darkroom 930, CCD cameras 915 disposed on the backside of the light-transmissive screen 913 constituting the detecting device of the position-adjusting device of the optical modulator, a CCD camera 916 (light detecting portion) disposed approximately at center of the light-transmissive screen 913, and driving mechanisms 917 for moving the CCD cameras 915 and 916 along the surface of the light-transmissive screen 913.

A transmitting window 913X for transmitting the light irradiated from the light source unit 740 through the optical unit 170 is formed on the light-transmissive screen 913.

At the lower center of the mirror 923, a position sensor 918 for detecting the white laser-beam irradiated by the laser beamer 743 is provided.

Figure 25:
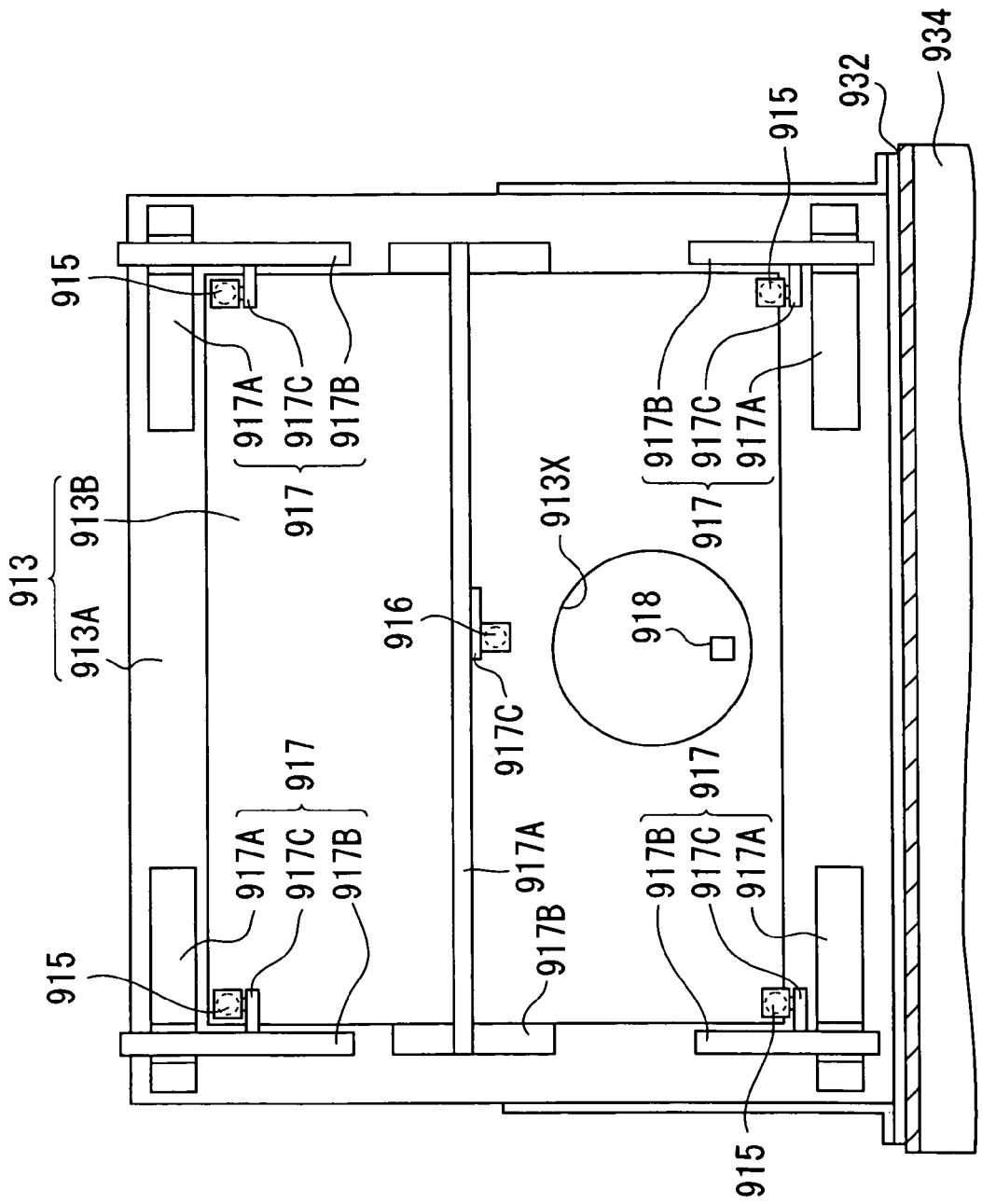
FIG. 25 is an illustration showing a light-transmissive screen of the projecting portion body of the position-adjusting system.

As shown in FIG. 25, the light-transmissive screen 913 includes a rectangular frame 913A provided on the periphery thereof, and a screen body 913B provided inside the frame 913A.

The screen body 913B is formed by evenly dispersing optical beads on an opaque resin layer, where, when the light beam is incident on the side on which the optical beads are provided, the light beam is irradiated on the backside of the screen body 913B by the optical beads working as lenses.

Both of the CCD cameras 915 as a detecting device and the CCD camera 916 as a light detecting portion are area sensors having Charge Coupled Device as the image pickup element, the CCD cameras detecting the projection image formed on the backside of the screen body 913B and outputting the projection image as an electrical signal.

In the present embodiment, the CCD cameras 915 and 916 are attached around the four corners of the rectangular projection image displayed on the light-transmissive screen 913 through the driving mechanism 917, where the CCD cameras 915 are disposed around the four corners of the projection image and the CCD camera 916 is disposed approximately at the center of the projection image.

Incidentally, in order to detect the projection image with high accuracy, the CCD cameras 915 and 916 have a zooming/focusing mechanism that can adjust the zoom/focus by remote control.

The position sensor 918 (a point sensor) is provided with a semiconductor position detecting element to measure two-dimensional position of the light spot of the white laser-beam or the like, in which a photodiode is used as the detecting element.

The driving mechanism 917 includes a horizontal portion 917A extending in the horizontal direction of the frame 913A, a vertical portion 917B extending in the vertical direction of the frame 913A, and a camera-attaching portion 917C for attaching the CCD cameras 915 and 916.

The CCD cameras 915 can move along the light-transmissive screen 913 by the horizontal movement of the vertical portions 917B relative to the horizontal portions 917A and the vertical movement of the camera-attaching portions 917C relative to the vertical portions 917B.

On the other hand, the CCD camera 916 is movable along the light-transmissive screen 913 by the slide vertical movement of the horizontal portion 917A relative to the vertical portion 917B and the horizontal movement of the camera-attaching portions 917C relative to the horizontal portion 917A.

When the prism position is adjusted (described below), the white laser-beam is detected by the position sensor 918, and when determining the optical-axis position of the optical unit 170, the white laser-beam is also detected by the position sensor 918.

Incidentally, the position sensor 918 is used in adjusting the prism position considering the tracking and detecting ability of the light spot by the white laser beam that greatly displaces when the position of the cross dichroic prism 150 is adjusted.

The CCD cameras 915, 916 and the position sensor 918 can be moved by remote control through a servo control mechanism inside the platform.

As shown in FIGS. 18 and 19, the reflector 920 reflects the projection light irradiated from the light source unit 740 through the projection lens 160 to the light-transmissive screen 913, which includes a reflector body 921 opposed to the projection lens 160 and a reflector driving mechanism 922 capable of moving the reflector body 921 toward and away from the projection lens 160.

The reflector body 921 includes a mirror 923 provided in plane with the reflector body 921 in accordance with the position of the irradiated projection light, a mounting plate 924 on which the mirror 923 is attached, and a supporting plate 925 for supporting the lower side of the mounting plate 924.

The mirror 923 is formed so that a reflecting surface 923A thereof is orthogonal to the optical axis of the projection light irradiated from the projection lens 160.

The reflector driving mechanism 922 includes a plurality of rails 926 provided on the bottom plate 932 of the darkroom 930 extending in a direction orthogonal to the surface of the light-transmissive screen 913, wheels 927 provided under the supporting plate 925 and capable of rotating relative to the rails, and a driving mechanism (not shown) for rotating the wheels 927.

[3-4] Description of Controlling Structure of Position-Adjusting System

Figure 26:
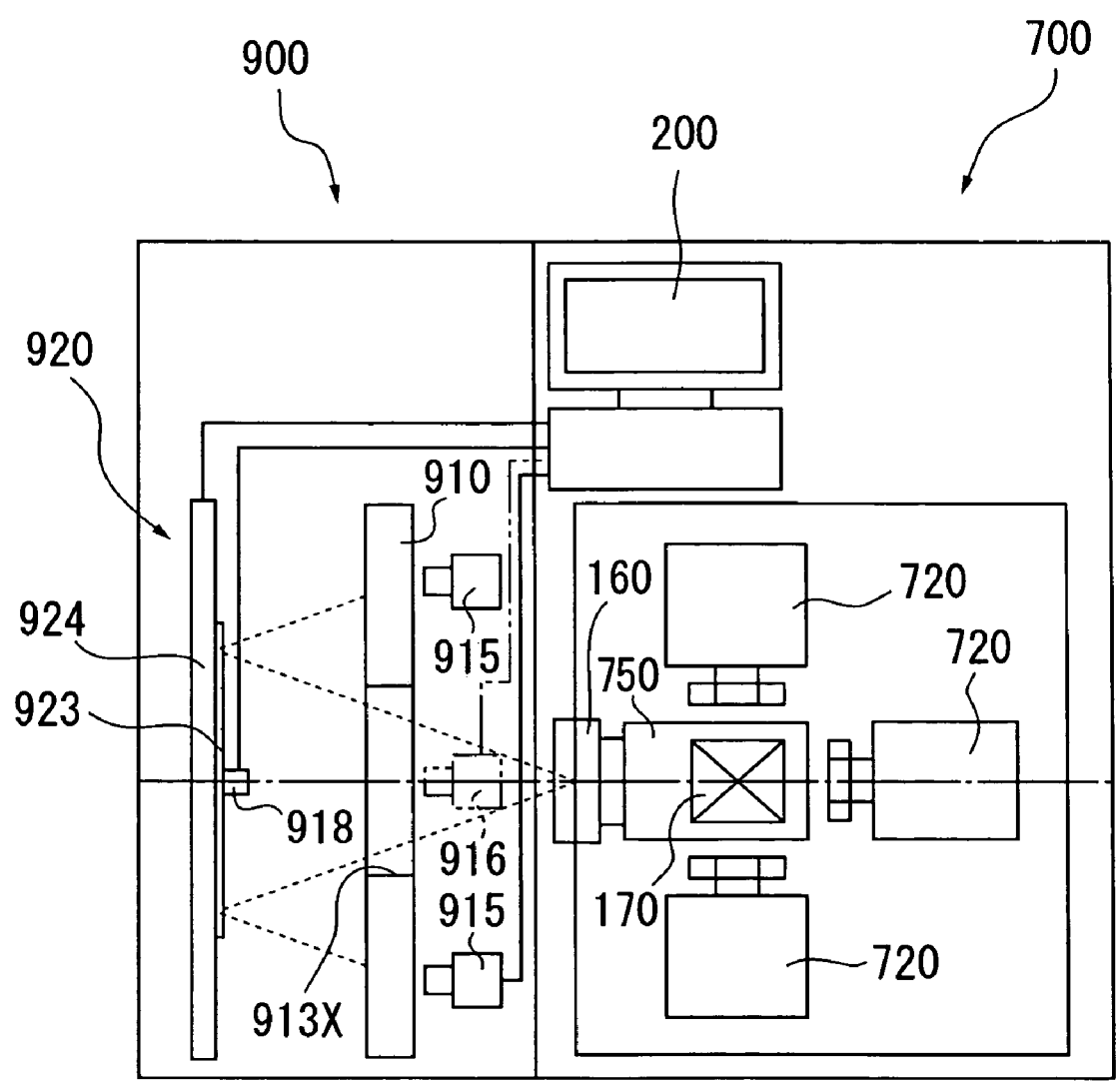
FIG. 26 is an illustration showing a computer for controlling the position-adjusting system is acquired.

As shown in FIG. 26, the adjuster body 700, the screen unit 910 and the reflector 920 are electrically connected to the computer 200 (a controller).

The computer 200 has a CPU and a storage to control the operation of the servo mechanism of the adjuster body 700, the screen unit 910 and the reflector 920, the computer being connected to the CCD cameras 915, 916 and the position sensor 918 through an image importing device such as a video capturing board.

The projection images taken by the CCD cameras 915 are inputted into the computer 200 through the image importing device, and, after being converted into a computer-readable image signal, processed by an image processing program operated on an OS that provides operational control the operation of the CPU-containing computer 200 to adjust the focus and alignment of the liquid crystal panels 141R, 141G and 141B.

Similarly, the projection image taken by the CCD camera 916 is processed by a prism position adjusting program and an optical-axis calculating program operated on the OS to adjust the position of the cross dichroic prism 150 and calculate the optical axis of the optical unit 170.

The position of the light spot detected by the position sensor 918 is imported to the computer 200 as an image to be processed by the same image processing program as described above.

[3-5] Arrangement When Acquiring Reference Position of Liquid Crystal Panel

Figure 27:
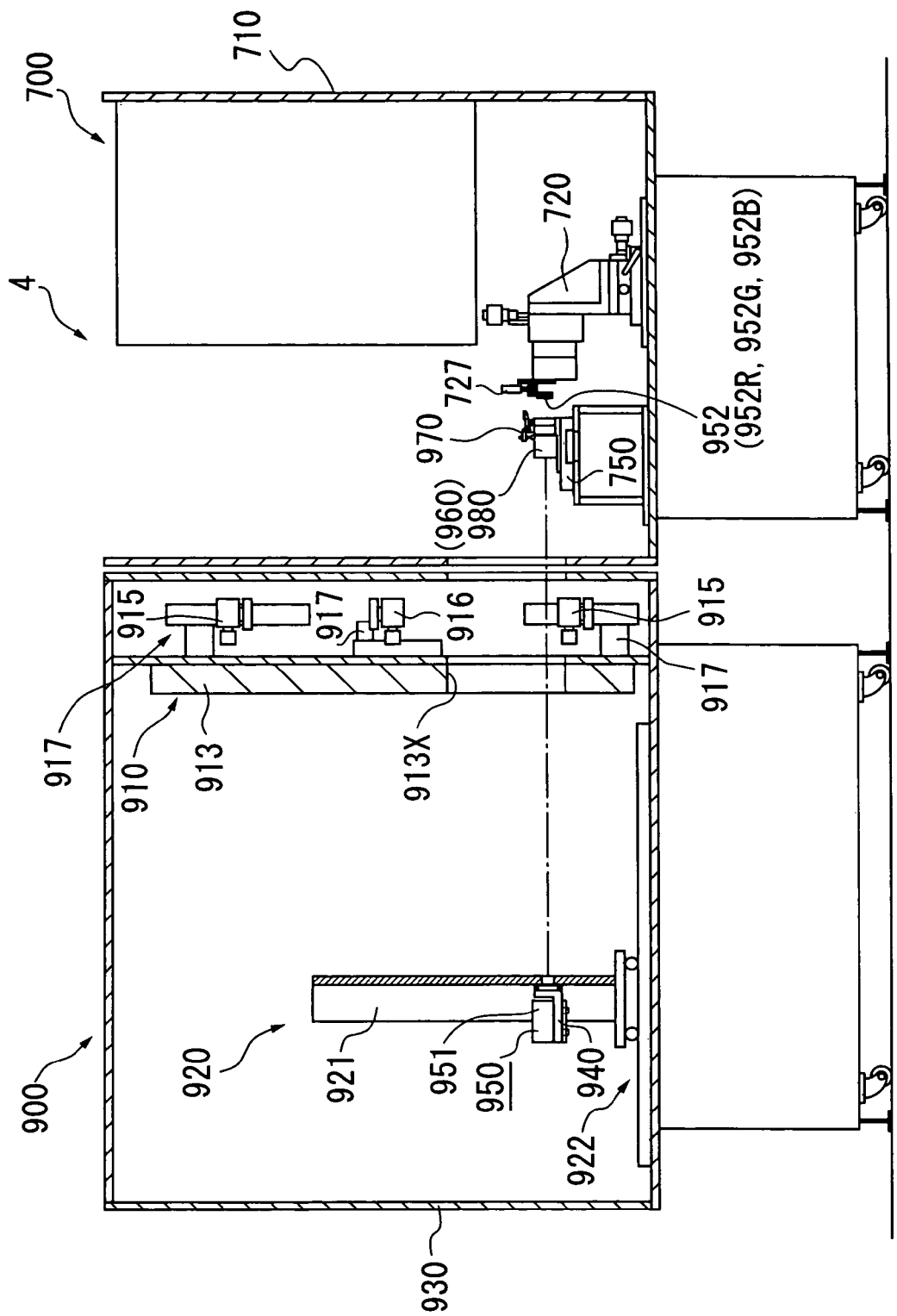
FIG. 27 is an illustration showing how to acquire the reference position of the liquid crystal panel.

FIG. 27 shows an arrangement for acquiring a reference position of the liquid crystal panel 141.

As shown in FIG. 27, the reference position of the liquid crystal panel 141 is acquired using the above-described position-adjusting system 4 with the configurations of the projecting portion body 900 and the adjuster body 700 being partly changed.

Specifically, in acquiring the reference position of the liquid crystal panel 141, an installation jig 940 is provided at the position of the CCD camera 916 of the reflector 920 instead of the CCD camera 916. A part of a laser-beamer 950 (laser beam outputting portion) is located above the installation jig 940.

The installation jig 940 is attached to the backside of the reflector body 921 of the reflector 920 for supporting the laser-beamer 950 in a manner that the laser-beamer 950 can be moved within the installation jig 940. Specifically, though not shown in the drawings, an elongated hole is formed on the upper side of the installation jig 940, and the laser-beamer 950 is screwed to the installation jig 940 through the long hole in a movable manner.

The laser-beamer 950 includes a laser-beamer body 951 screwed to the upper side of the installation jig 940, and a plate-shaped reflection mirror 952 as a second reflection member attached to the liquid crystal panel holder 727 of the six-axis position adjusting unit 720, which is similar to an automatic collimator. Incidentally, in the reflector body 921, at the position corresponding to the laser beam outputting portion of the laser-beamer 950, a hole penetrating from front face to back face is formed on the reflector body 921 to irradiate the laser-beam irradiated by the laser-beamer 950 toward the adjuster body 700 through the hole.

The reflection mirror 952 is attached to the liquid crystal panel holder 727 of the six-axis position adjusting unit 720 instead of the liquid crystal panel 141, and therefore includes three reflection mirrors 952R, 952G and 952B corresponding to the three color lights.

The laser beam (irradiated light) irradiated by the laser-beamer body 951 is reflected by, for instance, the reflection mirror 952G for the green light and the reflected light is detected by the laser-beamer body 951. Accordingly, the laser-beamer body 951 can acquire the actual reflected light position relative to the previously acquired designed irradiated light position.

Incidentally, when the laser beam is incident on the reflection mirror 952R or 952B attached to the liquid crystal panel holder 727 respectively corresponding to the red light and blue light, a glass triangular block 960 for reflecting the light beam after bending by ninety degrees is attached to the platform 750 through the attachment jig 970.

[3-6] Reference Position of Liquid Crystal Panel Acquiring Steps

The reference position acquiring process of the liquid crystal panel will be described below.

Figure 29:
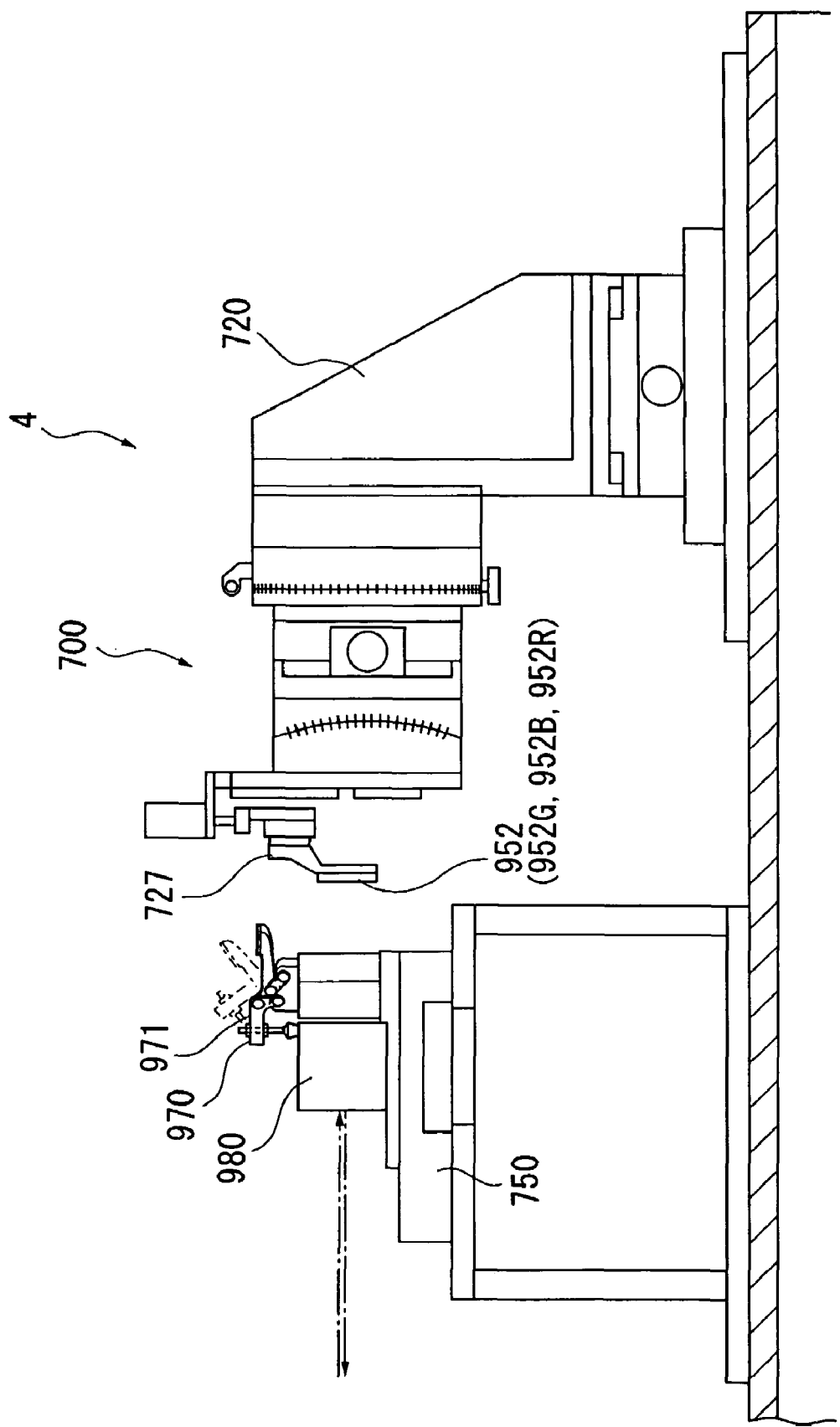
FIG. 29 is an illustration showing a part of the position-adjusting system in an enlarged manner.
Figure 30:
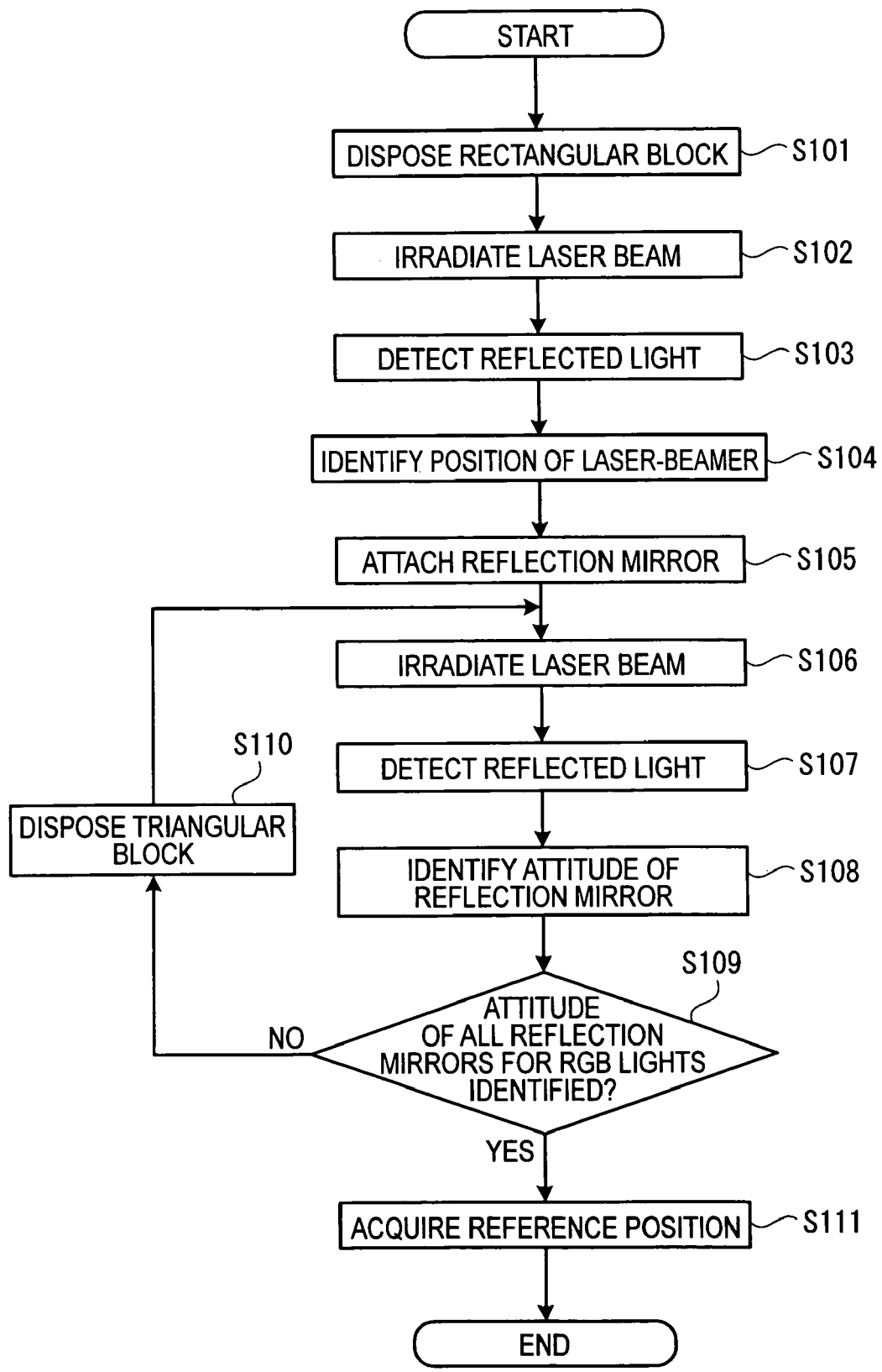
FIG. 30 is a flowchart showing a process for acquiring a reference position of the liquid crystal panel of the third embodiment.

FIG. 29 is an illustration showing a part of the position-adjusting system 4 in an enlarged manner. FIG. 30 is a flowchart showing a process for acquiring a reference position of the liquid crystal panel.

As shown in FIGS. 29 and 30, after the attachment jig 970 is attached to the platform 750, a rectangular block 980 as a first reflecting member is set to the attachment jig 970 and is fixed to the attachment jig 970 by a clamp 971 (step S101).

The rectangular block 980 is an approximately cubic glass component, each face of which can reflect the light beam.

The clamp 971 clamps the upper side of the rectangular block 980 or the triangular block 960 mounted on the platform 750 to be pressed onto the platform 750 to fix the block 960 or 980 on the platform 750.

Next, as shown in FIG. 27, the laser beam is irradiated to the surface of the rectangular block 980 by the laser-beamer 950 (step S102), and the light reflected by the rectangular block 980 in the direction approximately opposite to the direction of the irradiated light is detected by the laser-beamer 950 (step S103).

The position of the laser-beamer 950 relative to the installation jig 940 is changed so that the irradiated light is aligned with the reflected light to identify the position of the laser-beamer 950 (step S104: laser-beamer position identifying step).

The rectangular block 980 is detached from the attachment jig 970, and the three reflection mirrors 952R, 952G and 952B are attached to the liquid crystal panel holders 727 of the six-axis position adjusting units 720 (step S105: second reflection member holding step).

In the above state, in other words, where nothing is mounted on the platform. 750, the laser beam is irradiated to the surface of the reflection mirror 952G from the laser-beamer 950 (step S106), and the light reflected by the reflection mirror 952G in the direction approximately opposite to the direction of the irradiated light is detected by the laser-beamer 950 (step S107).

Next, the attitude of the reflection mirror 952G is adjusted by the six-axis position adjusting unit 720 to align the irradiated light with the reflected light to identify the attitude of the reflection mirror 952G (step S108: second reflection member attitude-adjusting step).

Figure 28:
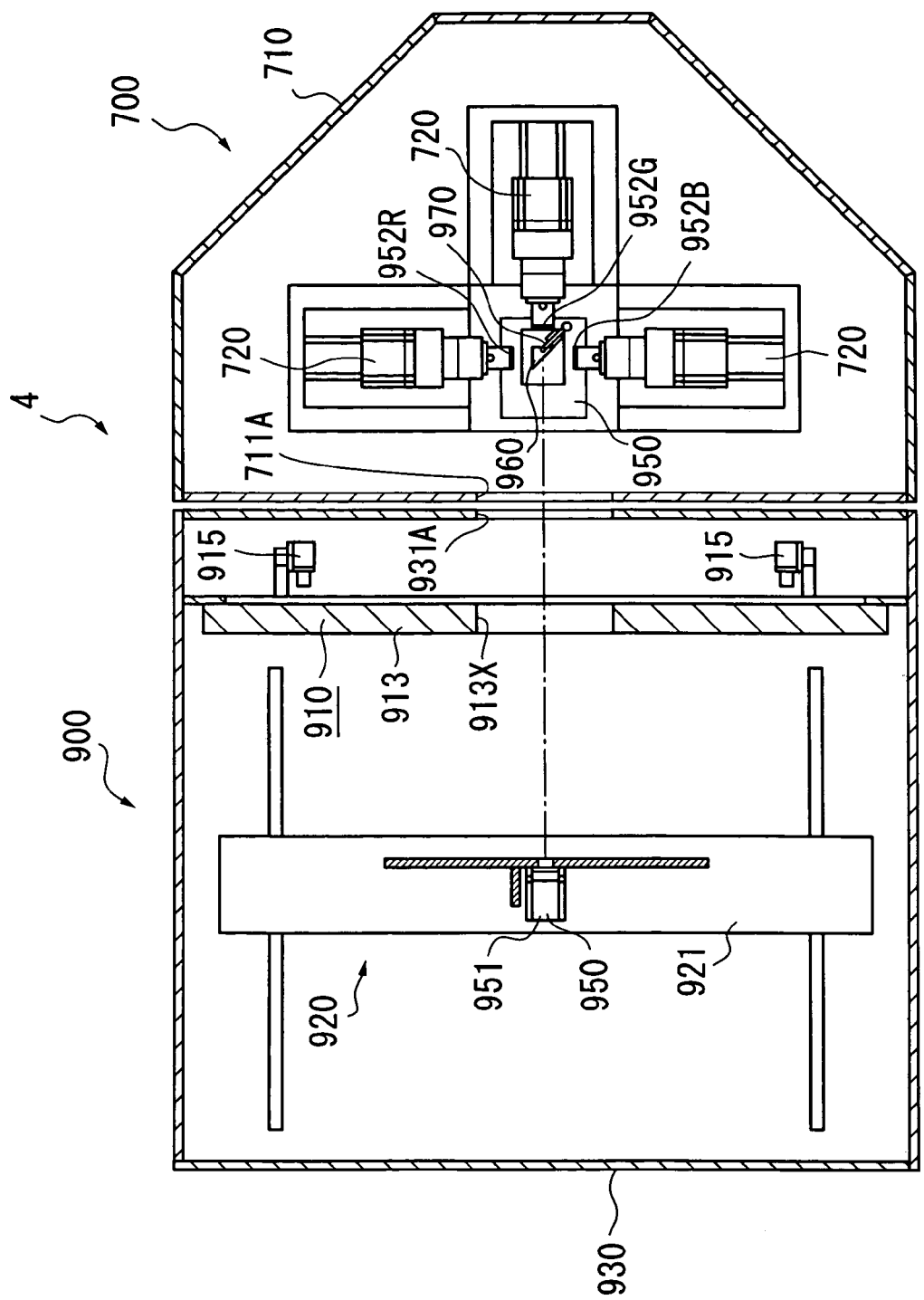
FIG. 28 is another illustration showing how the reference position of the liquid crystal panel is acquired.

The reflection mirror 952B for the blue light and the reflection mirror 952R for the red light are adjusted according to the same steps (step S109). At this time, as shown in FIG. 28, the triangular block 960 having a right triangle cross section is mounted on the platform 750 in the manner that the slant face of the triangle block 960 opposes to the laser-beamer 950 and the reflection mirror 952B, and the triangular block 960 is fixed to the platform 750 by the clamp 971 of the attachment jig 970 (step S110).

Next, the laser beam is irradiated by the laser-beamer 950 to the slant face of the triangular block 960 (step S106), which is bent and reflected by ninety degrees by the slant face of the triangular block 960 to be reflected by the reflection mirror 952B approximately in the opposite direction and is again bent and reflected by ninety degrees by the slant face of the triangular block 960 to be detected by the laser-beamer 950 (step S107).

Next, the attitude of the reflection mirror 952B is adjusted by the six-axis position adjusting unit 720 to align the irradiated light with reflected light to identify the attitude of the reflection mirror 952B. (step S108: second reflection member attitude-adjusting step).

Next, the triangular block 960 is mounted on the platform 750 in the manner that the slant face thereof is opposite to the laser-beamer 950 and the reflection mirror 952B, and the triangular block 960 is fixed to the platform 750 by the clamp 971. Thereafter, the attitude of the reflection mirror 952R is identified according to the same steps as that of the reflection mirror 952B (step S108: second reflection member attitude-adjusting step).

The spatial position of the liquid crystal panel holders 727 of the six-axis position adjusting unit 720 is acquired as the position data based on the attitude of the reflection mirrors 952R, 952G and 952B identified in the steps described above (step S111: reference position acquiring step). After the reference positions are acquired by the steps described above, the attachment jig 970 is detached from the platform 750, and the cross dichroic prism 150 and the liquid crystal panels 141 (141R, 141G and 141B) are mounted to adjust the position thereof.

Figure 31:
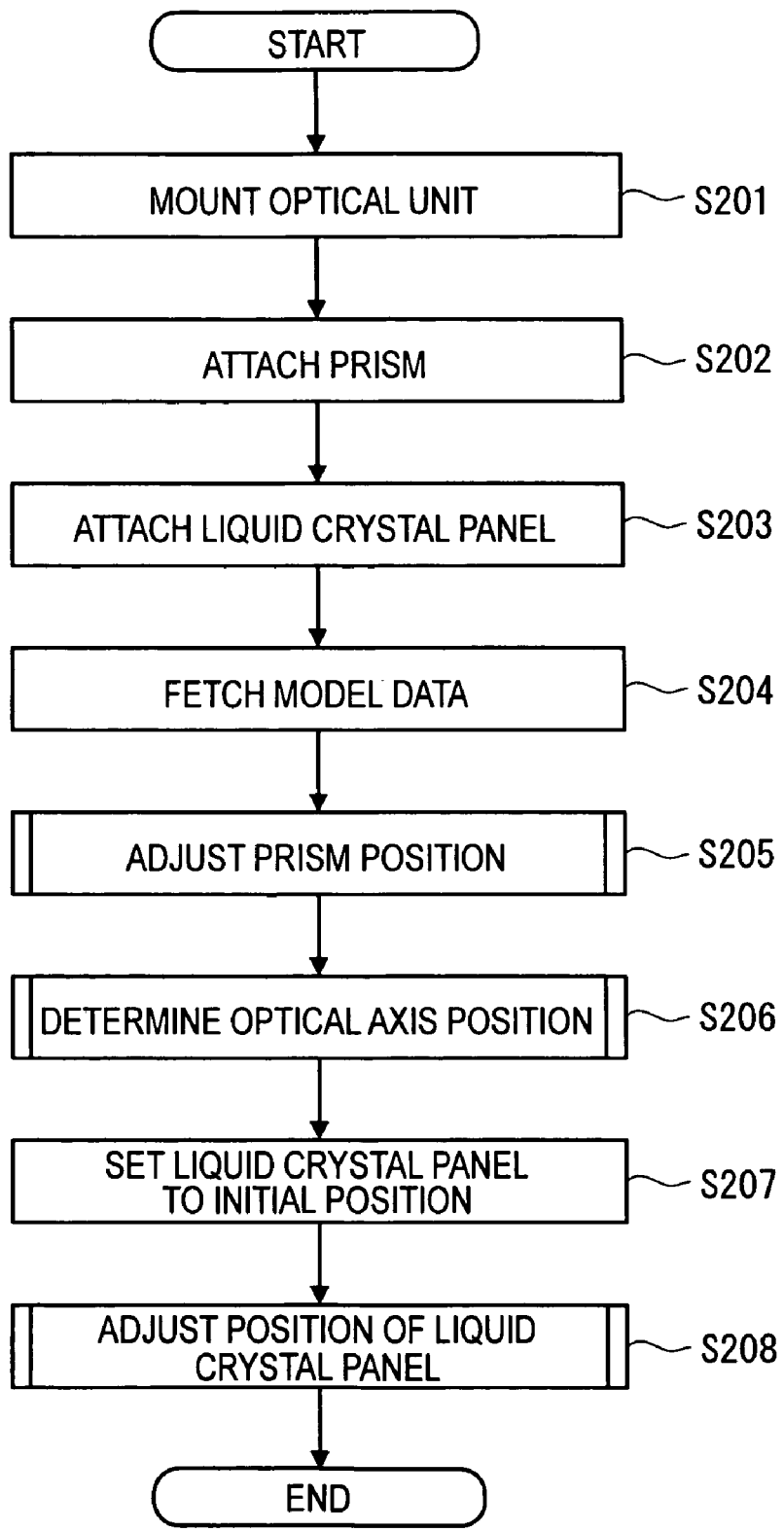
FIG. 31 is a flowchart showing an adjustment process of an optical unit.

[3-7] Position Adjustment of Prism and Liquid Crystal Panels by Position-Adjusting System In the position-adjusting system 4, the adjustment operation of the optical unit 170 to be adjusted is conducted according to the flowchart as shown in FIG. 31.

(1) The optical unit 170 is formed by combining the upper light guide and the lower light guide, which contain various optical components, and is mounted on the platform 750 of the adjustor body 700 (step S201). At this time, only the fixing plate 152A is fixed to the lower light guide by the screws 154, and the uncured ultraviolet curing adhesive 153 is coated on the mount surface of the cross dichroic prism 150.

(2) The cross dichroic prism 150 is attached to the prism position adjusting unit 730 (step S202), and the liquid crystal panels 141R, 141G and 141B are attached to the six-axis position adjusting units 720 (step S203). Incidentally, the liquid crystal panels 141R, 141G and 141B are attached by inserting the pins 145 on which the ultraviolet curing adhesive is coated into the hole 143A formed at the four corners of the holding frame 143 while the adhesive is uncured.

(3) By operating the computer 200, the model data of the different models previously registered in the storage are fetched to be loaded in the memory of the CPU (step S204). The model data includes designed positions of the cross dichroic prism 150 and the liquid crystal panels 141R, 141G and 141B, and the designed positions are regarded as initial positions when adjusting respective positions.

Figure 32:
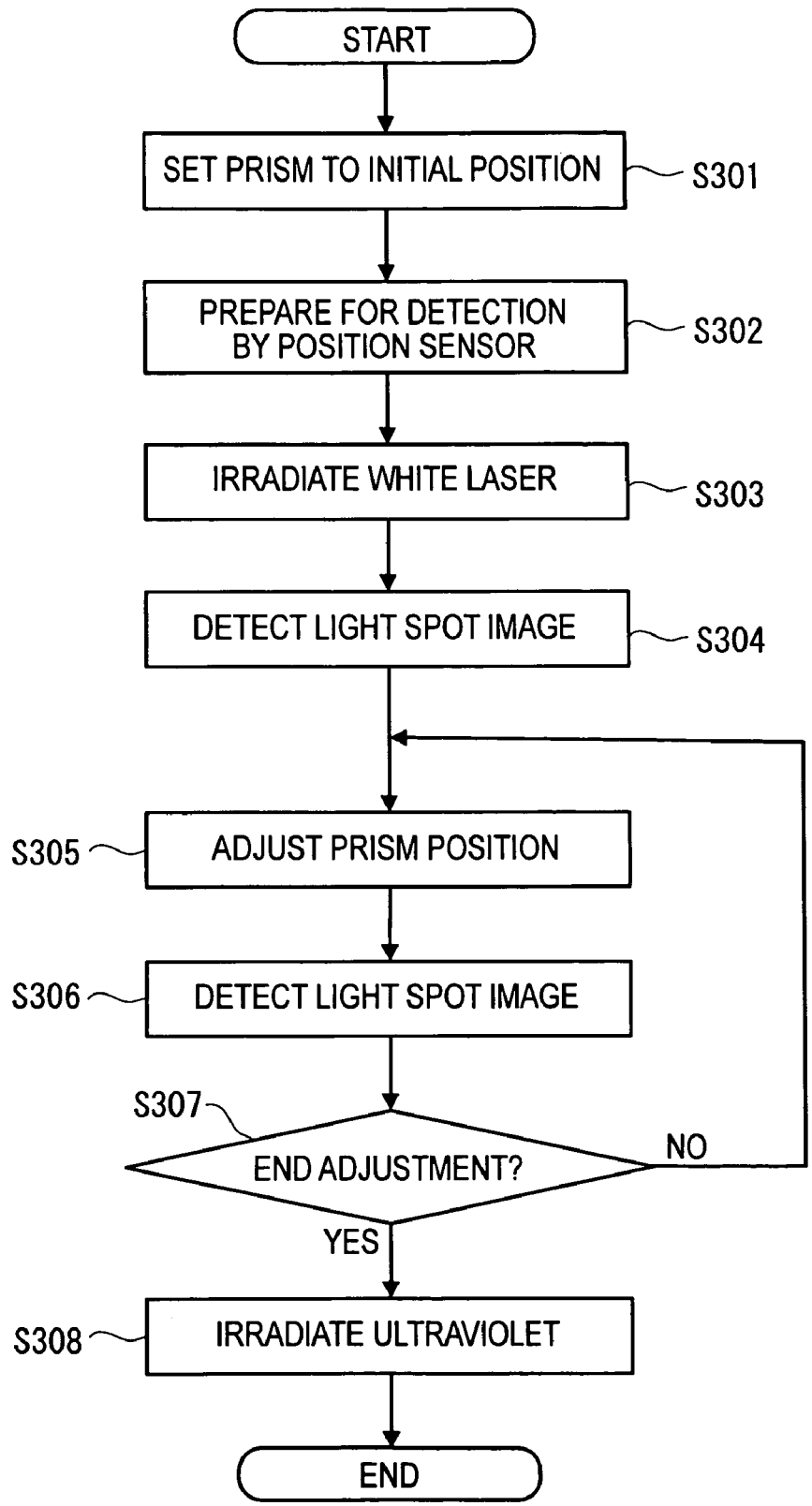
FIG. 32 is a flowchart showing how the position of the cross dichroic prism is adjusted.

(4) After the preparation for the adjustment is completed, the position of the prism is adjusted (step S205), specifically, according to the flowchart shown in FIG. 32.

(4-1) The control command is outputted to the prism position adjusting unit 730 by the CPU of the computer 200 based on the designed position of the cross dichroic prism 150 corresponding to the model data loaded in the memory. The cross dichroic prism 150 is set to the initial position thereof by the prism position adjusting unit 730 based on the control command (step S301). Incidentally, at the same time, the CPU also outputs control command to the six-axis position adjusting unit 720 to escape the attached liquid crystal panels 141R, 141G and 141B to the positions where the white laser beam for adjusting the cross dichroic prism 150 is not interfered.

(4-2) The position sensor 918 is moved by the CPU of the computer 200 approximately to the center of the projection image projected on the light-transmissive screen 913 to prepare for the detection by position sensor 918 (step S302). Further, the movable mirror 742F of the light source unit 740 is moved and the white laser beam is irradiated by the laser beamer 743 (step S303).

(4-3) The white laser beam irradiated by the light source unit 740 is separated into three color lights of red, green and blue in the optical unit 170, and thereafter the separated lights are combined again by the cross dichroic prism 150 to form a light spot image on the light-transmissive screen 913 through the projection lens 160. All light spot images of the respective color lights are detected by the position sensor 918 (step S304).

(4-4) The light spot image detected by the position sensor 918 is imported into the computer 200 as a numeric signal, based on which the control command is outputted to the prism position adjusting unit 730 by the CPU of the computer 200 to adjust the position of the cross dichroic prism 150 (step S305), and, after adjusting the position of the cross dichroic prism 150, the light spot image is detected again (step S306).

(4-5) The CPU of the computer 200 calculates the area of the light spot image using the image processing program while adjusting the position of the prism, and judges whether the adjustment should be completed or not based on the calculated area (step S307).

(4-6) After the position of the cross dichroic prism 150 is adjusted, the CPU outputs the control command to the prism position adjusting unit 730 by CPU, based on which the ultraviolet is irradiated by the ultraviolet irradiator 734 of the prism holder 731 of the prism position adjusting unit 730 to cure the ultraviolet curing adhesive 153 applied on the fixing plate 152A (step S308), and the position adjustment of the cross dichroic prism 150 is completed.

Figure 33:
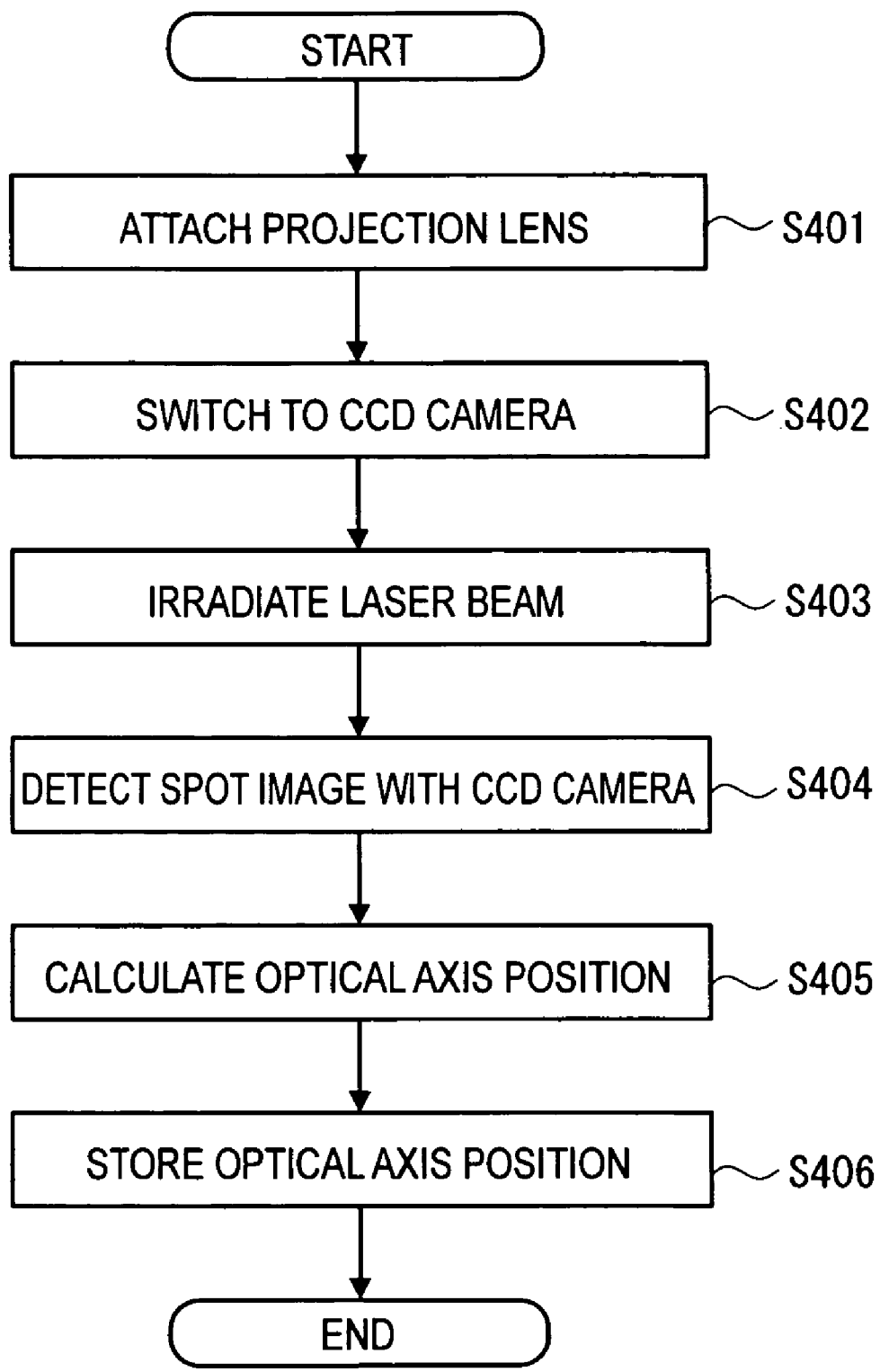
FIG. 33 is a flowchart showing how the position of the optical unit is determined.

(5) After the prism position adjusting step is completed and the position of the cross dichroic prism 150 is determined, the step for determining the position of the optical axis of the optical unit 170 is conducted (step S206), which is specifically according to the flowchart as shown in FIG. 33.

(5-1) The projection lens 160 having average optical properties is attached to the optical unit 170 as a master lens (step S401).

(5-2) The control command is outputted to the driving mechanism 917 by the CPU of the computer 200 to switch the position sensor 918 to the CCD camera 916, to prepare for the detection by the CCD camera 916 (step S402).

(5-3) The control command is outputted to the laser beamer 743 by the CPU of the computer 200 to irradiate the white laser light to project a spot light image on the light-transmissive screen 913 through the projection lens 160 (step S403), and the spot light image projected on the light-transmissive screen 913 is detected by the CCD camera 916 disposed at the center of the screen (step S404), and outputted to the computer 200 as a numeric signal.

(5-4) The position of the optical axis of the optical unit 170 is calculated by the CPU of the computer 200 based on the barycentric position of the laser spot on the CCD camera 916 (step S405), and stored in the memory (step S406).

(6) After recognizing the optical axis position of the optical unit 170, the CPU of the computer 200 generates the control command to be outputted to the six-axis position adjusting unit 720 based on the designed positions of the liquid crystal panels 141R, 141G and 141B contained in the model data, and the six-axis position adjusting unit 720 moves the liquid crystal panels 141R, 141G and 141B to the initial positions where the pins 145 abut to the light incident surface of the cross dichroic prism 150 (step S207).

Figure 34:
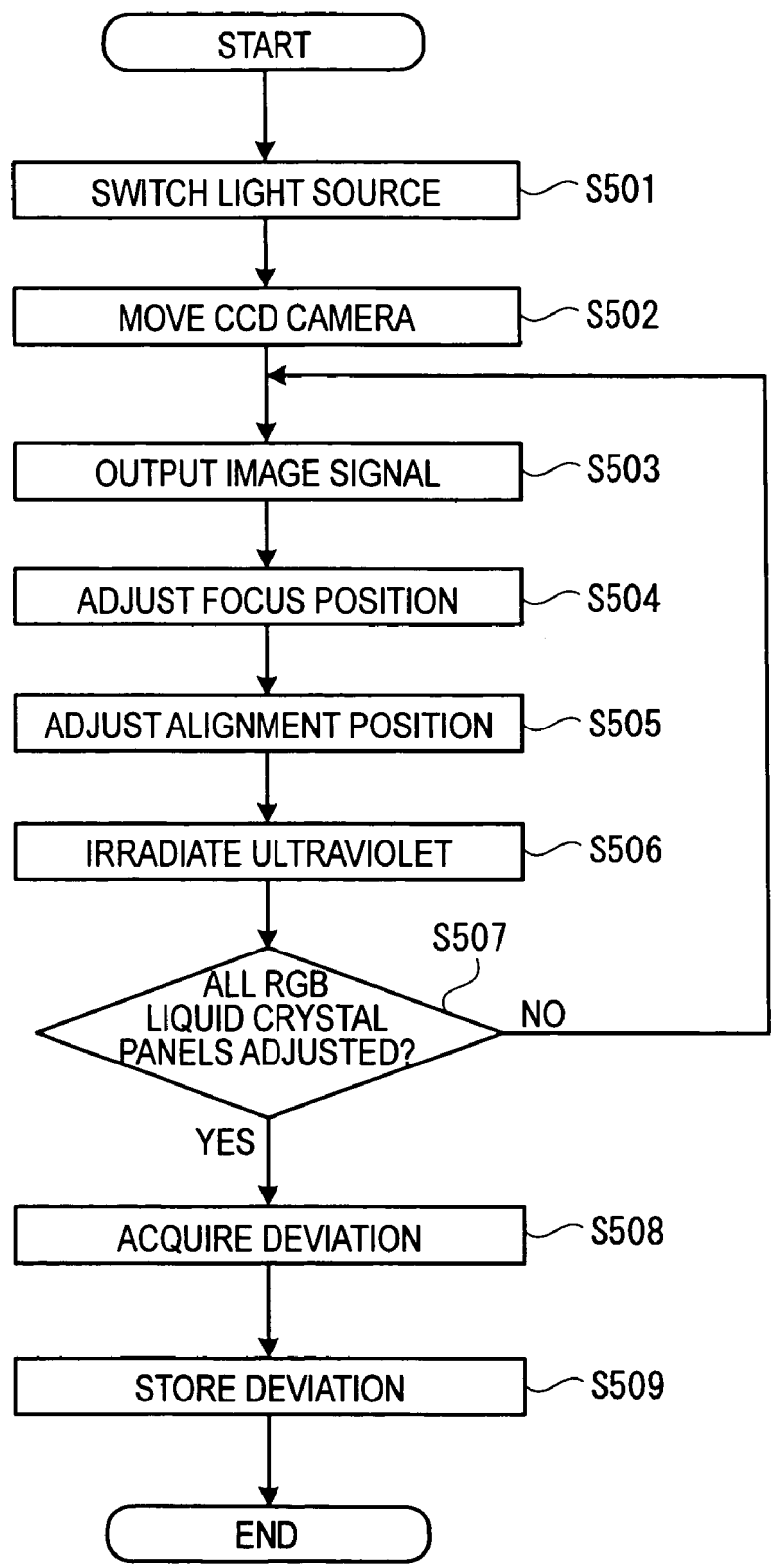
FIG. 34 is a flowchart showing how the position of the liquid crystal panel is adjusted relative to the aforesaid cross dichroic prism.

(7) After the optical axis position is determined, the positions of the liquid crystal panels 141R, 141G and 141B relative to the cross dichroic prism 150 are adjusted (step S208), specifically, according to the flowchart as shown in FIG. 34.

(7-1) The CPU of the computer 200 outputs a control command to the light source unit 740 to move the movable mirror 742F of the light source unit 740 to switch the white laser beam to the light source lamp 741A of the light source body 741 (step S501), so that the light source lamp 741A is lit (shutter open). The light beam irradiated by the light source lamp 741A is supplied to the optical unit 170 through the light-introducing portion 742 to be incident on the liquid crystal panels 141R, 141G and 141B through the light-beam transmitting holes 727D of the liquid crystal panel holder 727 to form the projection images at the four corners on the light-transmissive screen 913 through the projection lens 160.

(7-2) The four CCD cameras 915 disposed at the corners are moved by the CPU of the computer 200 to the four corners located based on the optical axis position of the optical unit 170 recognized in the above optical axis position determining step, so that the respective CCD cameras 915 can detect the projection images (step S502: combined light detecting process).

(7-3) In this state, image signals are outputted by the CPU of the computer 200, where the image pattern containing image signal for alignment adjustment is outputted only to the liquid crystal panel to be adjusted, and the image signal for projecting black image is outputted to the other liquid crystal panels (step S503). Incidentally, in the present embodiment, since the positions of the liquid crystal panels 141R and 141B are adjusted after the position of the liquid crystal panel 141G is adjusted, different image signals are outputted in accordance therewith. Incidentally, in adjusting the positions of the liquid crystal panels 141R, 141G and 141B, the positions of the three liquid crystal panels 141R, 141G and 141B may be adjusted simultaneously using a three-CCD camera in place of the CCD cameras 915, the adjustment can be conducted considerably quicker by the simultaneous position adjustment.

(7-4) The CPU of the computer 200 adjusts the focus of the liquid crystal panel 141G while keeping the optical axis position obtained in the previous step, and after completing the focus adjustment, the alignment is adjusted using the image pattern (step S504 and S505: optical modulator attitude-adjusting step).

(7-5) After the position of the liquid crystal panel 141G is adjusted, the ultraviolet is irradiated from the optical fibers to cure the ultraviolet curing adhesive applied on the distal ends of the pin 145 (step S506: optical modulator fixing step), and, thereafter, the image signal is outputted to adjust the liquid crystal panels 141R, and the previous steps are repeated until all the positions of the liquid crystal panels 141R, 141G and 141B are adjusted (step S507).

(7-6) The adjustment positions, (after the positions of the six-axis position adjusting unit 720 respectively acquired when adjusting the positions of the liquid crystal panels 141R, 141G and 141B), are acquired based on the previously acquired reference positions. Specifically, the deviations of the liquid crystal panels 141 relative to the reference positions are acquired by comparing the reference positions with the adjustment positions (step S508: deviation acquiring process). At this time, the deviations are stored to a hard disc or the like as deviation data, which are specific data measured with the data of angle (degree) and data of length (μm) (step S509: deviation data storing step).

As described above, the optical unit 170 is manufactured and the data on the attitude of the liquid crystal panels 141 of the manufactured optical unit 170 is acquired. Thereafter, based on the data on the attitude and the data on the projection lens 160, the optimum combination of the optical unit 170 and the projection lens 160 can be easily acquired by expressing as a function and the like.

[3-8] Advantages of the Third Embodiment

According to the third embodiment, following advantages can be obtained.

Since the deviations of the adjustment positions of the liquid crystal panels 141 relative to the reference positions can be acquired and accumulated as measuring data, by previously acquiring optical properties of individual projection lenses 160, the projection lens 160 suitable for the manufactured optical device 180 can be easily selected based on the relationship between the acquired deviations of the liquid crystal panels 141 and the optical properties of the respective projection lenses 160. By using such combination, the optical device 180 capable of the projecting clear image can be manufactured with high efficiency and high accuracy.

Since the reference position of the liquid crystal panel holder 727 of the six-axis position adjusting unit 720 can be easily recognized only by aligning the irradiated light from the laser-beamer 950 with the reflected lights reflected by the surface of the reflection mirrors 952, the deviations of the adjustment positions relative to the reference positions can be easily acquired as the data of length (μm) and angle (degree). Accordingly, the measuring data of the deviation is easy to be understood by an operator, so that the workability can be improved.

[4] Modification of Embodiments

The scope of the present invention is not restricted to the above embodiments, but includes modifications and improvements as long as objects of the present invention can be attained, which includes the modifications described below.

In the first and second embodiments, though the positions of the liquid crystal panels 141R, 141G and 141B are adjusted by directly detecting the combined light irradiated from the cross dichroic prism 150 by the CCD cameras 41, a screen may be prepared on the downstream of the projection lens 160, and the projection image may be indirectly detected by CCD cameras. However, the above embodiments are advantageous in that the size of the position-adjusting device 2 can be reduced.

Further, in the projection lens inspection device 3 of the first and second embodiments, though the image light irradiated by the light source through the projection lens 160 is reflected by the mirror 520 is employed, a linear optical system without the mirror 520 may be employed. In other words, the projection lens inspection device 3 may be arranged in any manner as long as the respective optical property values can be acquired.

Though the distribution label 600 is used in the first and second embodiments, such arrangement is not limiting. For instance, in which a predetermined check number may be previously attached to the projection lens 160, and the check number may be stored in the computer 70 being associated with the optical property values measured by the projection lens inspection device 3. In other words, any arrangement can be employed as long as the projection lens 160 is associated with the optical property values of the projection lens 160.

Though the optical property values of the projection lens 160 are indicated with a bar-code 601 in the above embodiments, the optical property values also can be indicated in the other way.

Figure 17:
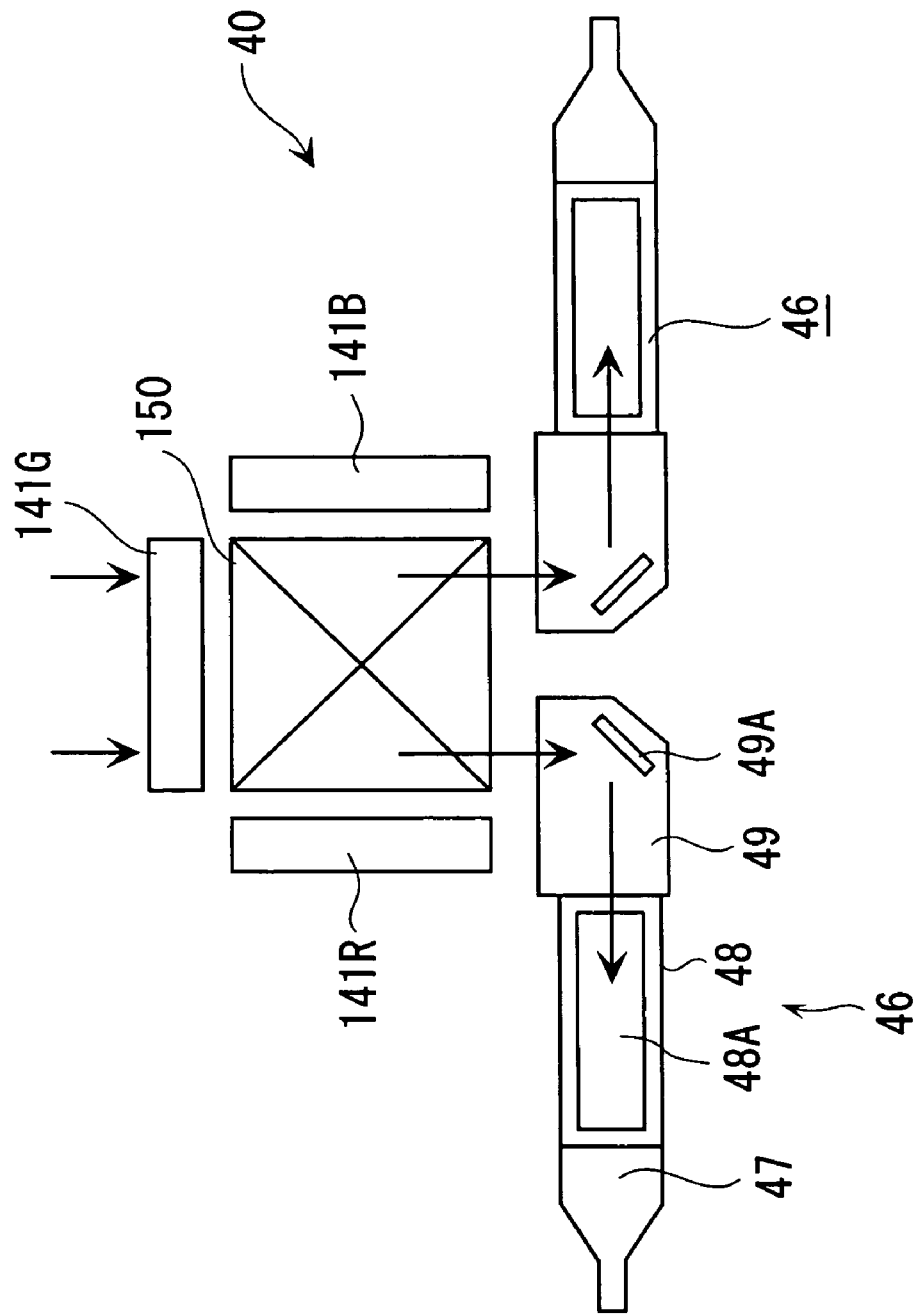
FIG. 17 is a plan view showing a modification of the light-beam detector.

Further, in the first and second embodiments, the arrangement of the CCD camera 41 can also be arranged as shown in FIG. 17. Specifically, four CCD cameras 46 shown in FIG. 17 respectively include a CCD camera body 47, a casing 48 in which a lens 48A is accommodated therein, and a mirror unit 49 in which a total reflection mirror 49A is accommodated by an angle of forty-five degrees relative to the light-irradiation surface of the cross dichroic prism 150.

In such CCD camera 46, the light beam irradiated from the cross dichroic prism 150 is introduced into the mirror unit 49 to be totally reflected by the total reflection mirror 49A approximately at a right angle. Thereafter, the reflected light beam is detected by the CCD camera body 47 through the lens 48A. Since the lens 48A is accommodated in the casing 48 and the total reflection mirror 49A is accommodated in the mirror unit 49, the introduced light beam does not leak to the outside and the influence of the external light can be avoided. With such arrangement, each CCD camera 46 can function independently, so that the structure of the light-beam detector 40 can be simplified.

Though the liquid crystal panels 141R, 141G and 141B are used as the optical modulators for modulating light according to the image signal in the above embodiments, other arrangement is possible. Specifically, the present invention may be applied to adjust the positions of an optical modulator for optical modulation other than the liquid crystal panels such as a device using micro-mirrors.

Though the optical device 180 is installed in the projector 100 in the above embodiments, the optical device may be installed on the other optical equipment.

Though the positions of the liquid crystal panels 141R, 141G and 141B are adjusted in the order of 141R, 141G and 141B in the third embodiment, the positions of the three liquid crystal panels may be simultaneously adjusted.

Though the enlarged projection image is detected by the CCD cameras 915 through the projection lens 160 in the third embodiment, such arrangement is not limiting limited. The position of the optical axis and the alignment of the optical modulators may be directly adjusted without interposing a projection lens.

The specific structure and arrangement and the like in implementing the present invention may be designed in any manner as long as an object of the invention can be attained.

INDUSTRIAL AVAILABILITY

The present invention can be used to adjust a position of an optical modulator of an optical apparatus having a plurality of optical modulators and a color combining optical system, which can be suitably used in manufacturing an optical apparatus such as a projector.

What is claimed is:

1. An optical device manufacturing method for manufacturing an optical device having: a plurality of optical modulators that respectively modulate a plurality of color lights in accordance with image information; and a color combining optical system including a plurality of light-incident surfaces to which the respective optical modulators are attached and a light-irradiation surface from which the color light incident on the respective light-incident surfaces is irradiated after being combined, the method comprising:

an optical properties acquiring step in which optical properties of a projection optical system to be combined with the optical device are acquired;

a reference position acquiring step in which a reference position of the optical modulator relative to the color combining optical system is acquired;

a deviation calculating step in which a deviation of the optical modulator relative to the reference position is calculated based on the acquired optical properties of the projection optical system;

a combined light detecting step in which a combined light irradiated from the light-irradiation surface is detected using a light-beam detector; and an optical modulator position-adjusting step in which the position of the optical modulator is adjusted based on the deviation while detecting the combined light in the combined light detecting step.

2. The optical device manufacturing method according to claim 1, wherein, in the optical modulator position-adjusting step, after the position of the optical modulator is adjusted while detecting the combined light, the optical modulator is moved in a direction of the optical axis of the projection optical system by a distance corresponding to the deviation.

3. The optical device manufacturing method according to claim 1, wherein, in the optical modulator position-adjusting step, the position of the optical modulator is adjusted after adjusting the position of the light-beam detector based on the deviation.

4. The optical device manufacturing method according to claim 1, wherein the optical properties acquiring step is conducted by reading the optical properties recorded on a distribution label attached corresponding to the projection optical system to be combined.

5. An optical device manufactured with the optical device manufacturing method according to claim 1.

6. The optical device manufacturing method according to claim 2, wherein the optical properties acquiring step is conducted by reading the optical properties recorded on a distribution label attached corresponding to the projection optical system to be combined.

7. An optical device manufactured with the optical device manufacturing method according to claim 2.

8. The optical device manufacturing method according to claim 3, wherein the optical properties acquiring step is conducted by reading the optical properties recorded on a distribution label attached corresponding to the projection optical system to be combined.

9. An optical device manufactured with the optical device manufacturing method according to claim 3.

10. An optical device manufactured with the optical device manufacturing method according to claim 4.

11. A projector having the optical device according to claim 5.

12. An optical device manufacturing method for manufacturing an optical device having a plurality of optical modulators that respectively modulate a plurality of color lights in accordance with image information, a color combining optical system including a plurality of light-incident surfaces to which the respective optical modulators are attached and a light-irradiation surface from which the color lights incident on the respective light-incident surfaces and irradiated after being combined, the method comprising:

a combined light detecting step in which a combined light irradiated from the light-irradiation surface of the color combining optical system is detected using a light-beam detector;

an optical modulator attitude-adjusting step in which the attitude of the optical modulator relative to the color combining optical system is adjusted while detecting the combined light, the optical modulators being held by a holder of a position-adjusting device that adjust the position of the respective optical modulators;

an optical modulator fixing step in which the optical modulator of which attitude has been adjusted is fixed to the light-incident surface of the color combining optical system;

a reference position acquiring step in which a reference position of the holder of the position-adjusting device relative to the light-beam detector is acquired before conducting the optical modulator attitude-adjusting step;

a deviation acquiring step in which, after conducting the optical modulator attitude-adjusting step, the acquired reference position of the holder is compared with an adjustment position at which the holder is located after the attitude of the optical modulator is adjusted to acquire a deviation of the adjustment position relative to the reference position of the holder; and a deviation data storing step in which the acquired deviation is stored as a measurement data.

13. The optical device manufacturing method according to claim 12, the reference position acquiring step further comprising:

a laser-beamer position identifying step in which a laser beam is irradiated from a laser-beamer approximately perpendicularly onto a surface of a first reflection member provided on a predetermined position on a platform on which the color combining optical system is mounted and the light reflected by the first reflection member is detected, so that the position of the laser-beamer is identified by aligning the irradiated light with the reflected light;

a second reflection member holding step in which a second reflection member is held by the holder of the position-adjusting device;

a second reflection member attitude-adjusting step in which the laser beam is irradiated from the laser-beamer of which position has been identified to the second reflection member held by the holder, and the attitude of the second reflection member held on the holders are adjusted while detecting the reflected light by the light-beam detector by aligning the irradiated light with the reflected light; and a reference position acquiring step in which the position of the holder when the attitude of the second reflection member is adjusted is acquired as the reference position.

14. The optical device manufacturing method according to claim 12, wherein, in the deviation acquiring step, the measurement data of the deviation is acquired by a unit of length and angle.

15. An optical device manufactured with the optical device manufacturing method according to claim 12.

16. The optical device manufacturing method according to claim 13, wherein, in the deviation acquiring step, the measurement data of the deviation is acquired by a unit of length and angle.

17. An optical device manufactured with the optical device manufacturing method according to claim 13.

18. An optical device manufactured with the optical device manufacturing method according to claim 14.

* * * * *

UNITED STATES PATENT AND TRADEMARK OFFICE
CERTIFICATE OF CORRECTION

PATENT NO. : 7,004,590 B2
APPLICATION NO. : 10/488992
DATED : February 28, 2006
INVENTOR(S) : Masashi KITABAYASHI It is certified that error appears in the above-identified patent and that said Letters Patent is hereby corrected as shown below:

On the title Page: Item

(30) Foreign Application Priority Data should read:

Sep. 11, 2001   (JP).......2001-275690
    Jul. 3, 2002    (JP).......~~2001-194879~~ 2002-194879

Signed and Sealed this

Eighth Day of August, 2006

JON W. DUDAS
*Director of the United States Patent and Trademark Office*